(12) United States Patent
Doi et al.

(10) Patent No.: US 7,035,592 B1
(45) Date of Patent: Apr. 25, 2006

(54) RADIO DEVICE AND METHOD OF CALIBRATION OF ANTENNA DIRECTIVITY

(75) Inventors: Yoshiharu Doi, Gifu (JP); Toshinori Iinuma, Gifu (JP); Yasunori Akatsuka, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/926,232

(22) PCT Filed: Mar. 21, 2000

(86) PCT No.: PCT/JP00/01724

§ 371 (c)(1),
(2), (4) Date: Sep. 27, 2001

(87) PCT Pub. No.: WO00/60757

PCT Pub. Date: Oct. 12, 2000

(30) Foreign Application Priority Data

Mar. 30, 1999 (JP) ................................. 11-089155

(51) Int. Cl.
*H04B 17/00* (2006.01)
(52) U.S. Cl. ................................ 455/67.11; 455/67.13; 455/67.14; 455/67.16
(58) Field of Classification Search .................... None
See application file for complete search history.

(56) References Cited

U.S. PATENT DOCUMENTS

| | | | |
|---|---|---|---|
| 4,532,518 A | | 7/1985 | Gaglione et al. |
| 6,037,898 A | * | 3/2000 | Parish et al. ................. 342/174 |
| 6,137,999 A | * | 10/2000 | Lovelace et al. ........... 455/302 |
| 6,463,295 B1 | * | 10/2002 | Yun ............................ 455/522 |

FOREIGN PATENT DOCUMENTS

| | | |
|---|---|---|
| JP | 62-001303 | 1/1987 |
| JP | 10-503892 | 4/1998 |

(Continued)

OTHER PUBLICATIONS

B. Widrow et al.; Proceedings of the IEEE, vol. 55, No. 12, pp. 2143-2159, Dec. 1967.

(Continued)

*Primary Examiner*—Fan Tsang
*Assistant Examiner*—Matthew Genack
(74) *Attorney, Agent, or Firm*—Westerman, Hattori, Daniels & Adrian, LLP

(57) ABSTRACT

A radio apparatus includes an antenna (104), and a transmission circuit (102) and a receiving circuit (105) sharing the antenna. The apparatus connects an output of the transmission circuit to an input of the receiving circuit in calibration for calculating the quantity of phase rotation and/or the quantity of amplitude fluctuation of a signal passing through the transmission and receiving circuits. Then, it connects a reference signal to the input of the receiving circuit for calculating the quantity of phase rotation and/or the quantity of amplitude fluctuation of a signal passing through the receiving circuit. Based on the subtraction of the information, the quantity of phase rotation and/or the quantity of amplitude fluctuation of a signal passing through the transmission circuit is calculated. It calculates a correction value for correcting difference in quantity of phase rotation and/or quantity of amplitude fluctuation between the transmission and receiving circuits on the basis of the information. Thus, the difference in quantity of phase rotation and/or quantity of amplitude fluctuation between the transmission circuit and the receiving circuit can be corrected.

37 Claims, 19 Drawing Sheets

FOREIGN PATENT DOCUMENTS

| | | |
|---|---|---|
| JP | 11-8507 | 1/1999 |
| JP | 11-46180 | 2/1999 |
| WO | WO 95/34103 | 12/1995 |

OTHER PUBLICATIONS

S. P. Applebaum; IEEE Transactions on Antennas and propagation, vol. AP-24, No. 5, pp. 585-598, Sep. 1976.

B. Widrow et al.; Prentice-Hall, Chapter 6, pp. 99-116, 1985.

R. Monzingo et al.; A Wiley-Interscience Publication, Chapter 3, pp. 78-105, 1980.

J.E. Hudson; IEE Electromagnetic Wave Series II, Chapter 3, pp. 59-154.

R. T. Compton, Jr., et al.; Prentice Hall, pp. 6-11.

E. Nicolau et al.; Elsevier, Chapter 8, pp. 122-163, 1989.

Communication from European Patent Office dated Jun. 3, 2004 in Application No. EP 00 90 9778.

Final Decision for Rejection in mailed Jun. 1, 2004 from Japanese Patent Office in Application No. 2000-610139 with translation.

* cited by examiner

FIG. 18

| 1 | 0 | ... | 1 | 0 | 1 | ... | 0 | 1 |
|---|---|-----|---|---|---|-----|---|---|
| PREAMBLE (SIGNAL SERIES KNOWN TO RADIO BASE STATION) ||||| DATA (VOICE etc.) (SIGNAL SERIES UNKNOWN TO RADIO BASE STATION) ||||

RADIO DEVICE AND METHOD OF CALIBRATION OF ANTENNA DIRECTIVITY

TECHNICAL FIELD

The present invention relates to a radio apparatus and a calibration method for its antenna directivity, and more particularly, it relates to a radio apparatus employed in an adaptive array radio base station and a calibration method for its antenna directivity.

BACKGROUND ART

In recent years, an adaptive array radio base station employing an array antenna is put into practice as a radio base station for a mobile communication system such as a portable telephone. The operation principle of such an adaptive array radio base station is described in the following literature, for example:

B. Widrow, et al.: "Adaptive Antenna Systems", Proc. IEEE, vol. 55, No. 12, pp. 2143–2159 (December 1967).

S. P. Applebaum: "Adaptive Arrays", IEEE Trans. Antennas & Propag., vol. AP-24, No. 5, pp. 585–598 (September 1976).

O. L. Frost, III: "Adaptive Least Squares Optimization Subject to Linear Equality Constraints", SEL-70-055, Technical Report, No. 6796-2, Information System Lab., Stanford Univ. (August 1970).

B. Widrow and S. D. Stearns: "Adaptive Signal Processing", Prentice-Hall, Englewood Cliffs (1985).

R. A. Monzingo and T. W. Miller: "Introduction to Adaptive Arrays," John Wiley & Sons, New York (1980).

J. E. Hudson: "Adaptive Array Principles", Peter Peregrinus Ltd., London (1981).

R. T. Compton, Jr.: "Adaptive Antennas—Concepts and Performance", Prentice-Hall, Englewood Cliffs (1988).

E. Nicolau and D. Zaharia: "Adaptive Arrays", Elsevier, Amsterdam (1989).

FIG. 16 is a model diagram conceptually showing the operation principle of such an adaptive array radio base station. Referring to FIG. 16, one adaptive array radio base station 1 comprises an array antenna 2 having n antennas #1, #2, #3, . . . , #n, and the range where its radio waves reach is expressed as a first oblique line area 3. On the other hand, the range where radio waves of another adjacent radio base station 6 reach is expressed as a second oblique line area 7.

In the area 3, transmission/receiving of radio signals is performed between a portable telephone 4 which is the terminal of a user A and the adaptive array radio base station 1 (arrow 5). In the area 7, on the other hand, transmission/receiving of radio signals is performed between a portable telephone 8 which is the terminal of another user B and the radio base station 6 (arrow 9).

When the frequency of the radio signal of the portable telephone 4 of the user A and the frequency of the radio signal of the portable telephone 8 of the user B happen to be equal to each other, it follows that the radio signal from the portable telephone 8 of the user B becomes an unnecessary interference signal in the area 3 and mixes into the radio signal between the portable telephone 4 of the user A and the adaptive array radio base station 1.

Thus, the adaptive array radio base station 1 receiving the mixed radio signals from both of the users A and B comes to output a signal mixed with the signals from both of the users A and B unless performing some processing, and it follows that talking of the user A to originally make a call is hindered.

In order to remove this signal from the user B from the output signal, the adaptive array radio base station 1 performs the following processing: FIG. 17 is a schematic block diagram showing the structure of the adaptive array radio base station 1.

Assuming that the signal from the user A is A(t) and the signal from the user B is B(t), a receive signal $x1(t)$ in the first antenna #1 forming the array antenna 2 of FIG. 16 is expressed in the following equation:

$$x1(t)=a1 \times A(t)+b1 \times B(t)$$

At this point, a1 and b1 are coefficients changing in real time as described later.

Then, a receive signal $x2(t)$ in the second antenna #2 is expressed in the following equation:

$$x2(t)=a2 \times A(t)+b2 \times B(t)$$

At this point, a2 and b2 are also coefficients similarly changing in real time.

Then, a receive signal $x3(t)$ in the third antenna #3 is expressed in the following equation:

$$x3(t)=a3 \times A(t)+b3 \times B(t)$$

At this point, a3 and b3 are also coefficients similarly changing in real time.

Similarly, a receive signal xn(t) in the n-th antenna #n is expressed in the following equation:

$$xn(t)=an \times A(t)+bn \times B(t)$$

At this pinot, an and bn are also coefficients similarly changing in real time.

The aforementioned coefficients a1, a2, a3, . . . , an express that difference takes place in receiving intensity in each antenna since relative positions of the respective ones of the antennas #1, #2, #3, . . . , #n forming the array antenna 2 are different with respect to the radio signal from the user A (for example, the respective antennas are arranged at intervals of about five times the wavelength of the radio signal, i.e., about 1 meter from each other).

The aforementioned coefficients b1, b2, b3, . . . , bn also express that difference takes place in receiving intensity in each of the antennas #1, #2, #3, . . . , #n with respect to the radio signal from the user B. Each user moves and hence these coefficients change in real time.

The signals $x1(t)$, $x2(t)$, $x3(t)$, . . . , xn(t) enter a receiving part 1R forming the adaptive array radio base station 1 through corresponding switches 10-1, 10-2, 10-3, . . . , 10-n, and the signals are supplied to a weight vector control part 11, and also supplied to one inputs of corresponding multipliers 12-1, 12-2, 12-3, . . . , 12-n respectively.

Weights w1, w2, w3, . . . , wn for the receive signals in the respective antennas are applied to other inputs of these multipliers from the weight vector control part 11. Theses weights are calculated by the weight vector control part 11 in real time, as described later.

Therefore, the receive signal $x1(t)$ in the antenna #1 becomes w1×(a1A(t)+b1B(t)) through the multiplier 12-1, the receive signal $x2(t)$ in the antenna #2 becomes w2×(a2A(t)+b2B(t)) through the multiplier 12-2, the receive signal $x3(t)$ in the antenna #3 becomes w3×(a3A(t)+b3B(t)) through the multiplier 12-3, and the receive signal xn(t) in the antenna #n becomes wn×(anA(t)+bnB(t)) through the multiplier 12-n.

Outputs from these multipliers 12-1, 1-2, 12-3, . . . , 12-n are added by an adder 13, and its output becomes as follows:

w1(a1A(t)+b1B(t))+w2(a2A(t)+b2B(t))+w3(a3A(t)+b3B(t))+ . . . +wn(anA(t)+bnB(t))

When dividing this to a term related to the signal A(t) and a term related to the signal B(t), it becomes as follows:

(w1a1+w2a2+w3a3+ . . . +wnan)A(t)+(w1b1+w2b2+w3b3+ . . . +wnbn)B(t)

At this point, the adaptive array radio base station 1 calculates the aforementioned weights w1, w2, w3, . . . , wn to be capable of identifying the user A and B and extracting only the signal from the desired user, as described later. In the example of FIG. 17, for example, the weight vector control part 11 regards the coefficients a1, a2, a3, . . . , an, b1, b2, b3, . . . , bn as constants and calculates the weights w1, w2, w3, . . . , wn so that the coefficients of the signal A(t) become 1 as a whole and the coefficients of the signal B(t) become 0 as a whole, in order to extract only the signal A(t) from the user A to originally make a call.

In other words, the weight vector control part 11 calculates such weights w1, w2, w3, . . . , wn that the coefficients of the signal A(t) become 1 and the coefficients of the signal B(t) become 0 in real time by solving the following simultaneous linear equations:

w1a1+w2a2+w3a3+ . . . +wnan=1 w1b1+w2b2+w3b3+ . . . +wnbn=0

While description of a method of solving these simultaneous linear equations is omitted, it is well known as described in the literature listed above, and actually already put into practice in adaptive array radio base stations.

By thus setting the weights w1, w2, w3, . . . , wn, an output signal from the adder 13 becomes as follows:

Output signal=1×A(t)+0×B(t)=A(t)

The aforementioned identification of the users A and B is performed as follows: FIG. 18 is a schematic diagram showing the frame structure of a radio signal of a portable telephone. The radio signal of the portable telephone is roughly formed by a preamble consisting of a signal series known to the radio base station and data (voice etc.) consisting of a signal series unknown to the radio base station.

The signal series of the preamble includes a signal series of information for judging whether or not this user is a desired user to make a call for the radio base station. The weight vector control part 11 (FIG. 17) of the adaptive array radio base station 1 compares a training signal corresponding to the user A extracted from a memory 14 and the received signal series with each other and performs weight vector control (decision of weights) to extract a signal conceivably including a signal series corresponding to the user A. The signal of the user A extracted in such a manner is externally output from the adaptive array radio base station 1 as an output signal $S_{RX}(t)$.

In FIG. 17, on the other hand, an external input signal $S_{TX}(t)$ enters a transmission part 1T forming the adaptive array radio base station 1, and is supplied to single inputs of multipliers 15-1, 15-2, 15-3, . . . , 15-n. The weights w1, w2, w3, . . . , wn previously calculated by the weight vector control part 11 on the basis of the receive signals are copied and applied to other inputs of these multipliers respectively.

The input signal weighted by these multipliers is sent to the corresponding antennas #1, #2, #3, . . . , #n through the corresponding switches 10-1, 10-2, 10-3, . . . , 10-n and transmitted into the area 3 of FIG. 16.

At this point, weighting targeting the user A is performed on the signal transmitted through the same array antenna 2 as that in receiving similarly to the receive signal, and hence the transmitted radio signal is received by the portable telephone 4 of the user A as if the same has directivity for the user A. FIG. 19 is a diagram imaging such transfer of the radio signal between the user A and the adaptive array radio base station 1. In contrast with the area 3 of FIG. 16 showing the range where radio waves actually reach, such a state is imaged that the radio signal is flown from the adaptive array radio base station 1 with directivity while targeting the portable telephone 4 of the user A.

In order to implement such transfer of radio signals with directivity between a desired user and the adaptive array radio base station 1, it is necessary that the weights w1, w2, w3, . . . , wn are strictly calculated in the adaptive array radio base station 1 and weighting is equivalently performed on receive signals and transmit signals in the receiving part 1R and the transmission part 1T. However, even if control of weighting is completely performed, there is a case where transmission characteristics of the transmit signals change with respect to the receive signals and the transmit signals cannot be flown toward the target.

In the adaptive array radio base station 1 shown in FIG. 17, for example, the distances between the switches 10-1, 10-2, 10-3, . . . , 10-n and the corresponding multipliers 12-1, 12-2, 12-3, . . . , 12-n of the receiving part 1R and the distances between the switches 10-1, 10-2, 10-3, . . . , 10-n and the corresponding multipliers 15-1, 15-2, 15-3, . . . , 15-n of the transmission part 1T are not completely identical to each other in general. If there is difference between these distances, difference in quantity of phase rotation, difference in quantity of amplitude fluctuation and the like take place between the receive signal and the transmit signal received/transmitted in/from each antenna, and transmission/receiving of radio signals cannot be performed with excellent directivity between the targeted user and the adaptive array radio base station.

In particular, paths between the switches 10-1, 10-2, 10-3, . . . , 10-n and the corresponding multipliers of the receiving part 1R include necessary receiving circuits respectively and paths between these switches and the corresponding multipliers of the transmission part 1T include necessary transmission circuits respectively in general, although not shown in FIG. 17. These receiving circuits and transmission circuits are physically different circuits, and it follows that difference in quantity of phase rotation, difference in quantity of amplitude fluctuation and the like take place between the receive signal and the transmit signal received/transmitted in/from each antenna also depending on the characteristics of amplifiers, filters, mixers etc. forming these circuits. For example, it follows that phase rotation and amplitude fluctuation take place due to individual difference and temperature change etc. in the characteristics of an LNA (Low Noise Amplifier) included in the receiving circuit, an HPA (High Power Amplifier) included in the transmission circuit and the like.

In the adaptive array radio base station 1, therefore, it is necessary to calculate transmission characteristics such as the quantity of phase rotation and the quantity of amplitude fluctuation of the receiving circuit and transmission characteristics such as the quantity of phase rotation and the quantity of amplitude fluctuation of the transmission circuit for every antenna forming the array antenna 2 and correct the difference therebetween. A measuring circuit for measuring these transmission characteristics has been separately provided on the adaptive array radio base station in general, and hence there has been such a problem that the circuit structure of the adaptive array radio base station is enlarged and complicated and the cost also increases.

The present invention aims at providing a radio apparatus capable of calculating and correcting the difference in quantity of phase rotation and quantity of amplitude fluctuation of a receiving circuit and a transmission circuit with a simple and low-priced structure without providing a specific measuring circuit and a calibration method for its antenna directivity.

DISCLOSURE OF THE INVENTION

According to the present invention, a radio apparatus capable of calibration of antenna directivity comprises an antenna, a transmission circuit and a receiving circuit sharing the antenna when transmitting/receiving signals, a reference signal generator generating a prescribed reference signal, switching means selectively connecting an output of the transmission circuit or the reference signal to an input of the receiving circuit in calibration, control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit, and arithmetic means calculating a correction value for correcting difference in quantity of phase rotation and/or quantity of amplitude fluctuation between the transmission circuit and the receiving circuit.

The arithmetic means includes means controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, means controlling the switching means to connect the reference signal to the input of the receiving circuit in calibration for calculating second information related to the quantity of phase rotation and/or the quantity of amplitude fluctuation caused in a signal passing through the receiving circuit, means subtracting the second information from the first information thereby calculating third information related to the quantity of phase rotation and/or the quantity of amplitude fluctuation caused in a signal passing through the transmission circuit, and means calculating the correction value on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled.

According to another aspect of the present invention, a radio apparatus capable of calibration of antenna directivity comprises a plurality of radio systems, and each of the radio systems comprises an antenna, a transmission circuit and a receiving circuit sharing the antenna when transmitting/receiving signals, a reference signal generator generating a prescribed reference signal, switching means selectively connecting an output of the transmission circuit or the reference signal to an input of the receiving circuit in calibration, control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit, and arithmetic means calculating a correction value for correcting difference in quantity of phase rotation and/or quantity of amplitude fluctuation between the transmission circuit and the receiving circuit.

The arithmetic means includes means controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, means controlling the switching means to connect the reference signal to the input of the receiving circuit in calibration for calculating second information related to the quantity of phase rotation and/or the quantity of amplitude fluctuation caused in a signal passing through the receiving circuit, means subtracting the second information from the first information thereby calculating third information related to the quantity of phase rotation and/or the quantity of amplitude fluctuation caused in a signal passing through the transmission circuit, and means calculating the correction value on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled in the radio apparatus consisting of a plurality of radio systems.

According to still another aspect of the present invention, a radio apparatus capable of calibration of antenna directivity comprises a reference signal generator generating a prescribed reference signal and a plurality of radio systems, and each of the radio systems comprises an antenna, a transmission circuit and a receiving circuit sharing the antenna when transmitting/receiving signals, switching means selectively connecting an output of the transmission circuit or the reference signal to an input of the receiving circuit in calibration, control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit, and arithmetic means calculating a correction value for correcting difference in quantity of phase rotation and/or quantity of amplitude fluctuation between the transmission circuit and the receiving circuit.

The arithmetic means includes means controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, means controlling the switching means to connect the reference signal to the input of the receiving circuit in calibration for calculating second information related to the quantity of phase rotation and/or the quantity of amplitude fluctuation caused in a signal passing through the receiving circuit, means subtracting the second information from the first information thereby calculating third information related to the quantity of phase rotation and/or the quantity of amplitude fluctuation caused in a signal passing through the transmission circuit, and means calculating the correction value on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled in the radio apparatus consisting of a reference signal generator and a plurality of radio systems.

Preferably, the means calculating second information includes storage means for storing previously detected fourth information related to the quantity of phase rotation and/or the quantity of amplitude fluctuation caused in the reference signal passing through a path from the reference signal generator to the switching means, means calculating fifth information related to the quantity of phase rotation and/or the quantity of amplitude fluctuation caused in the reference signal passing through the receiving circuit from the reference signal generator through the switching means, and means calculating the second information by subtracting the fourth information from the fifth information.

Therefore, the quantity of phase rotation and/or the quantity of amplitude fluctuation of the reference signal passing through the receiving circuit can be readily calculated by previously detecting the quantity of phase rotation and/or the quantity of amplitude fluctuation caused in the reference signal passing through the path from the reference signal generator to the switching means.

More preferably, the means calculating first information calculates the quantity of phase rotation and/or the quantity of amplitude fluctuation caused in a signal passing through the transmission circuit and the receiving circuit a prescribed number of times for supplying an average value thereof as the first information, and the means calculating fifth information calculates the quantity of phase rotation and/or the quantity of amplitude fluctuation caused in the reference signal passing through the receiving circuit from the reference signal generator through the switching means a prescribed number of times and supplies an average value thereof as the fifth information.

Therefore, measuring accuracy for the difference in quantity of phase rotation and/or quantity of amplitude fluctuation between the transmission circuit and the receiving circuit can be improved by averaging.

More preferably, the control means includes means sequentially changing the transmission frequency of the transmit signal supplied to the transmission circuit, and the arithmetic means calculates the correction value for every transmit signal of a different transmission frequency.

Therefore, phase-amplitude characteristics of the transmission circuit and the receiving circuit depend on the transmission frequency, and hence measuring accuracy for the difference in quantity of phase rotation and/or quantity of amplitude fluctuation between the transmission circuit and the receiving circuit can be improved by measurement at a plurality of frequencies.

More preferably, the arithmetic means further includes interpolation processing means calculating the correction value in a transmit signal of another transmission frequency by interpolation on the basis of the correction value calculated for the every transmit signal of a different transmission frequency.

Therefore, the difference in quantity of phase rotation and/or quantity of amplitude fluctuation between the transmission circuit and the receiving circuit can be measured at all necessary frequencies by performing measurement at representative frequencies and performing interpolation on the basis of the result thereof when the number of frequencies to be measured is large.

More preferably, the control means includes means sequentially changing the transmission power of the transmit signal supplied to the transmission circuit, and the arithmetic means calculates the correction value for every transmit signal of a different transmission power.

Therefore, phase-amplitude characteristics of the transmission circuit and the receiving circuit depend on the transmission power, and hence measuring accuracy for the difference in quantity of phase rotation and/or quantity of amplitude fluctuation between the transmission circuit and the receiving circuit can be improved by measurement at a plurality of transmission power levels.

More preferably, the arithmetic means further includes interpolation processing means calculating the correction value in a transmit signal of another transmission power by interpolation on the basis of the correction value calculated for the every transmit signal of a different transmission power.

Therefore, the difference in quantity of phase rotation and/or quantity of amplitude fluctuation between the transmission circuit and the receiving circuit can be measured at all necessary transmission power levels by performing measurement at representative transmission power levels and performing interpolation on the basis of the result thereof when the number of transmission power levels to be measured is large.

More preferably, the control means includes means sequentially changing the transmission frequency and transmission power of the transmit signal supplied to the transmission circuit, and the arithmetic means calculates the correction values for every transmit signal of a different transmission frequency and a different transmission power.

Therefore, phase-amplitude characteristics of the transmission circuit and the receiving circuit depend on the transmission frequency and the transmission power, and hence measuring accuracy for the difference in quantity of phase rotation and/or quantity of amplitude fluctuation between the transmission circuit and the receiving circuit can be improved by measurement at a plurality of transmission frequencies and a plurality of transmission power levels.

More preferably, the arithmetic means further includes interpolation processing means calculating the correction values in a transmit signal of another transmission frequency and another transmission power by interpolation on the basis of the correction values calculated for the every transmit signal of a different transmission frequency and a different transmission power.

Therefore, the difference in quantity of phase rotation and/or quantity of amplitude fluctuation between the transmission circuit and the receiving circuit can be measured at all necessary frequencies and transmission power levels by performing measurement at representative frequencies and transmission power levels and performing interpolation on the basis of the result thereof when the numbers of transmission frequencies and transmission power levels to be measured are large.

According to a further aspect of the present invention, it is a calibration method for antenna directivity in a radio apparatus, and the radio apparatus comprises an antenna, a transmission circuit and a receiving circuit sharing the antenna when transmitting/receiving signals, a reference signal generator generating a prescribed reference signal, switching means selectively connecting an output of the transmission circuit or the reference signal to an input of the receiving circuit in calibration, and control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit.

The calibration method comprises the steps of controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, controlling the switching means to connect the reference signal to the input of the receiving circuit in calibration for calculating second information related to the quantity of phase rotation and/or the quantity of amplitude fluctuation caused in a signal passing through the receiving circuit, subtracting the second information from the first information thereby calculating third information related to the quantity of phase rotation and/or the quantity of amplitude fluctuation caused in a signal passing through the transmission circuit, and calculating a correction value for correcting difference in quantity of phase rotation and/or quantity of amplitude fluctuation between the transmission circuit and the receiving circuit on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled.

According to a further aspect of the present invention, it is a calibration method for antenna directivity in a radio apparatus comprising a plurality of radio systems, and each of the radio systems comprises an antenna, a transmission circuit and a receiving circuit sharing the antenna when transmitting/receiving signals, a reference signal generator generating a prescribed reference signal, switching means selectively connecting an output of the transmission circuit or the reference signal to an input of the receiving circuit in calibration, and control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit.

The calibration method comprises the steps of controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, controlling the switching means to connect the reference signal to the input of the receiving circuit in calibration for calculating second information related to the quantity of phase rotation and/or the quantity of amplitude fluctuation caused in a signal passing through the receiving circuit, subtracting the second information from the first information thereby calculating third information related to the quantity of phase rotation and/or the quantity of amplitude fluctuation caused in a signal passing through the transmission circuit, and calculating a correction value for correcting difference in quantity of phase rotation and/or quantity of amplitude fluctuation between the transmission circuit and the receiving circuit on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled in the radio apparatus consisting of a plurality of radio systems.

According to a further aspect of the present invention, it is a calibration method for antenna directivity in a radio apparatus comprising a reference signal generator generating a prescribed reference signal and a plurality of radio systems, and each of the radio systems comprises an antenna, a transmission circuit and a receiving circuit sharing the antenna when transmitting/receiving signals, switching means selectively connecting an output of the transmission circuit or the reference signal to an input of the receiving circuit in calibration, and control means supplying a transmit signal to the transmission circuit while receiving a receive signal from the receiving circuit for controlling transmission directivity of the transmit signal transmitted through the transmission circuit and the antenna while controlling receiving directivity of the receive signal received through the antenna and the receiving circuit.

The calibration method comprises the steps of controlling the switching means to connect the output of the transmission circuit to the input of the receiving circuit in calibration for calculating first information related to the quantity of phase rotation and/or the quantity of amplitude fluctuation caused in a signal passing through the transmission circuit and the receiving circuit, controlling the switching means to connect the reference signal to the input of the receiving circuit in calibration for calculating second information related to the quantity of phase rotation and/or the quantity of amplitude fluctuation caused in a signal passing through the receiving circuit, subtracting the second information from the first information thereby calculating third information related to the quantity of phase rotation and/or the quantity of amplitude fluctuation caused in a signal passing through the transmission circuit, and calculating a correction value for correcting difference in quantity of phase rotation and/or quantity of amplitude fluctuation between the transmission circuit and the receiving circuit on the basis of the second information and the third information.

Therefore, according to the present invention, calibration reflecting the difference in quantity of phase rotation and/or quantity of amplitude fluctuation between the transmission circuit and the receiving circuit to control of antenna directivity and correcting an error in the directivity is enabled in the radio apparatus consisting of a reference signal generator and a plurality of radio systems.

More preferably, the step of calculating second information includes the steps of previously detecting and storing fourth information related to the quantity of phase rotation and/or the quantity of amplitude fluctuation caused in the reference signal passing through a path from the reference signal generator to the switching means, calculating fifth information related to the quantity of phase rotation and/or the quantity of amplitude fluctuation caused in the reference signal passing through the receiving circuit from the reference signal generator through the switching means, and calculating the second information by subtracting the fourth information from the fifth information.

Therefore, the quantity of phase rotation and/or the quantity of amplitude fluctuation of the reference signal passing through the receiving circuit can be readily calculated by previously detecting the quantity of phase rotation and/or the quantity of amplitude fluctuation caused in the reference signal passing through the path from the reference signal generator to the switching means.

More preferably, the step of calculating first information calculates the quantity of phase rotation and/or the quantity of amplitude fluctuation caused in the signal passing through the transmission circuit and the receiving circuit a prescribed number of times and supplies an average value thereof as the first information, and the step of calculating fifth information calculates the quantity of phase rotation and/or the quantity of amplitude fluctuation caused in the reference signal passing through the receiving circuit from the reference signal generator through the switching means a prescribed number of times and supplies an average value thereof as the fifth information.

Therefore, measuring accuracy for the difference in quantity of phase rotation and/or quantity of amplitude fluctuation between the transmission circuit and the receiving circuit can be improved by averaging.

More preferably, the calibration method further includes the steps of sequentially changing the transmission frequency of the transmit signal supplied to the transmission circuit, and repeating the step of calculating the correction value for every transmit signal of a different transmission frequency.

Therefore, phase-amplitude characteristics of the transmission circuit and the receiving circuit depend on the transmission frequency, and hence measuring accuracy for the difference in quantity of phase rotation and/or quantity of amplitude fluctuation between the transmission circuit and the receiving circuit can be improved by measurement at a plurality of frequencies.

More preferably, the calibration method further includes the step of calculating the correction value in a transmit signal of another transmission frequency by interpolation on the basis of the correction value calculated for the every transmit signal of a different transmission frequency.

Therefore, the difference in quantity of phase rotation and/or quantity of amplitude fluctuation between the transmission circuit and the receiving circuit can be measured at all necessary frequencies by performing measurement at representative frequencies and performing interpolation on the basis of the result thereof when the number of transmission frequencies to be measured is large.

More preferably, the calibration method further includes the steps of sequentially changing the transmission power of the transmit signal supplied to the transmission circuit, and repeating the step of calculating the correction value for every transmit signal of a different transmission power.

Therefore, phase-amplitude characteristics of the transmission circuit and the receiving circuit depend on the transmission power, and hence measuring accuracy for the difference in quantity of phase rotation and/or quantity of amplitude fluctuation between the transmission circuit and the receiving circuit can be improved by measurement at a plurality of transmission power levels.

More preferably, the calibration method further includes the step of calculating the correction value in a transmit signal of another transmission power by interpolation on the basis of the correction value calculated for the every transmit signal of a different transmission power.

Therefore, the difference in quantity of phase rotation and/or quantity of amplitude fluctuation between the transmission circuit and the receiving circuit can be measured at all necessary transmission power levels by performing measurement at representative transmission power levels and performing interpolation on the basis of the result thereof when the number of transmission power levels to be measured is large.

More preferably, the calibration method further includes the steps of sequentially changing the transmission frequency and transmission power of the transmit signal supplied to the transmission circuit, and repeating the step of calculating the correction value for every transmit signal of a different transmission frequency and a different transmission power.

Therefore, phase amplitude characteristics of the transmission circuit and the receiving circuit depend on the transmission frequency and the transmission power, and hence measuring accuracy for the difference in quantity of phase rotation and/or quantity of amplitude fluctuation between the transmission circuit and the receiving circuit can be improved by measurement at a plurality of transmission frequencies and a plurality of transmission power levels.

More preferably, the calibration method further includes the step of calculating the correction value in a transmit signal of another transmission frequency and another transmission power by interpolation on the basis of the correction value calculated for the every transmit signal of a different transmission frequency and a different transmission power.

Therefore, the difference in quantity of phase rotation and/or quantity of amplitude fluctuation between the transmission circuit and the receiving circuit can be measured at all necessary frequencies and transmission power levels by performing measurement at representative frequencies and transmission power levels and performing interpolation on the basis of the result thereof when the numbers of transmission frequencies and transmission power levels to be measured are large.

BRIEF DESCRIPTION OF THE DRAWINGS

FIG. 18 is a schematic diagram showing the frame structure of a radio signal of a portable telephone.

BEST MODES FOR CARRYING OUT THE INVENTION

Figure 1:
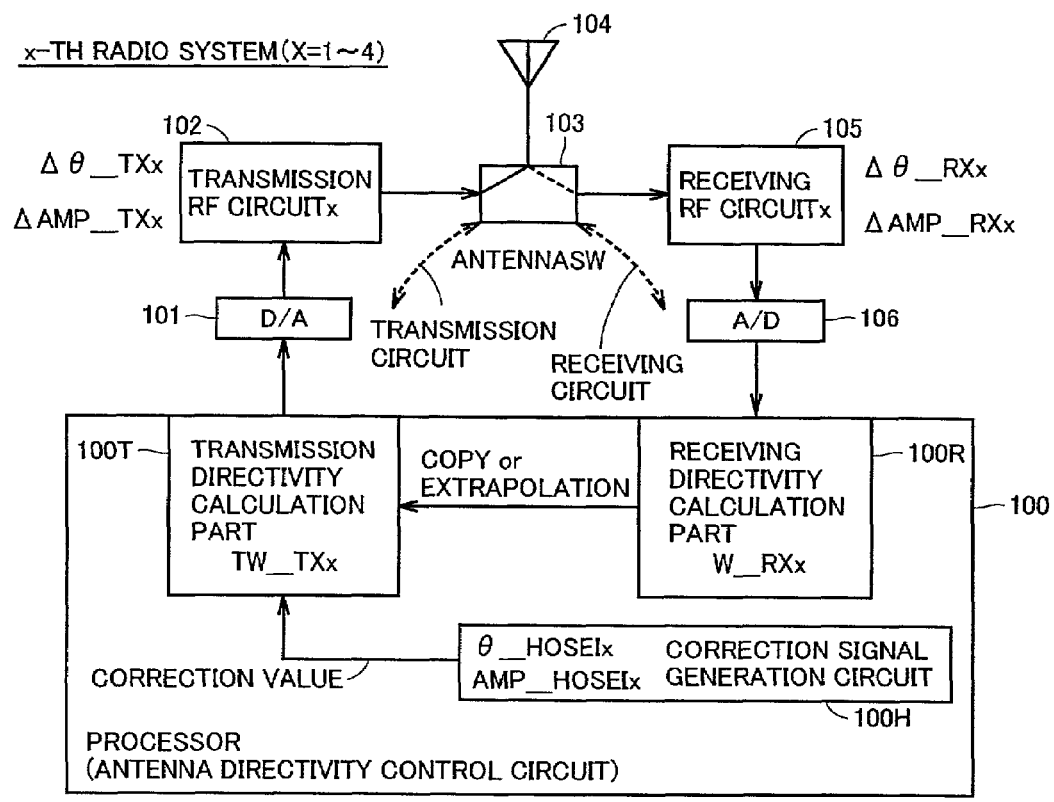
FIG. 1 is a schematic block diagram for illustrating the concept of correction of difference in quantity of phase rotation and quantity of amplitude fluctuation between a transmission circuit and a receiving circuit in a radio apparatus according to the present invention.

FIG. 1 is a schematic block diagram for illustrating the concept of correction of difference in quantity of phase rotation and quantity of amplitude fluctuation between a transmission circuit and a receiving circuit in a radio apparatus according to the present invention. The radio apparatus shown in FIG. 1 and an embodiment of each figure described later is a (e.g., an x-th) radio apparatus as each unit of a plurality of signal transmission systems (hereinafter referred to as radio systems) corresponding to a plurality of (n) antennas forming an adaptive array radio base station such as that shown in FIG. 16 to FIG. 19, for example.

Figure 17:
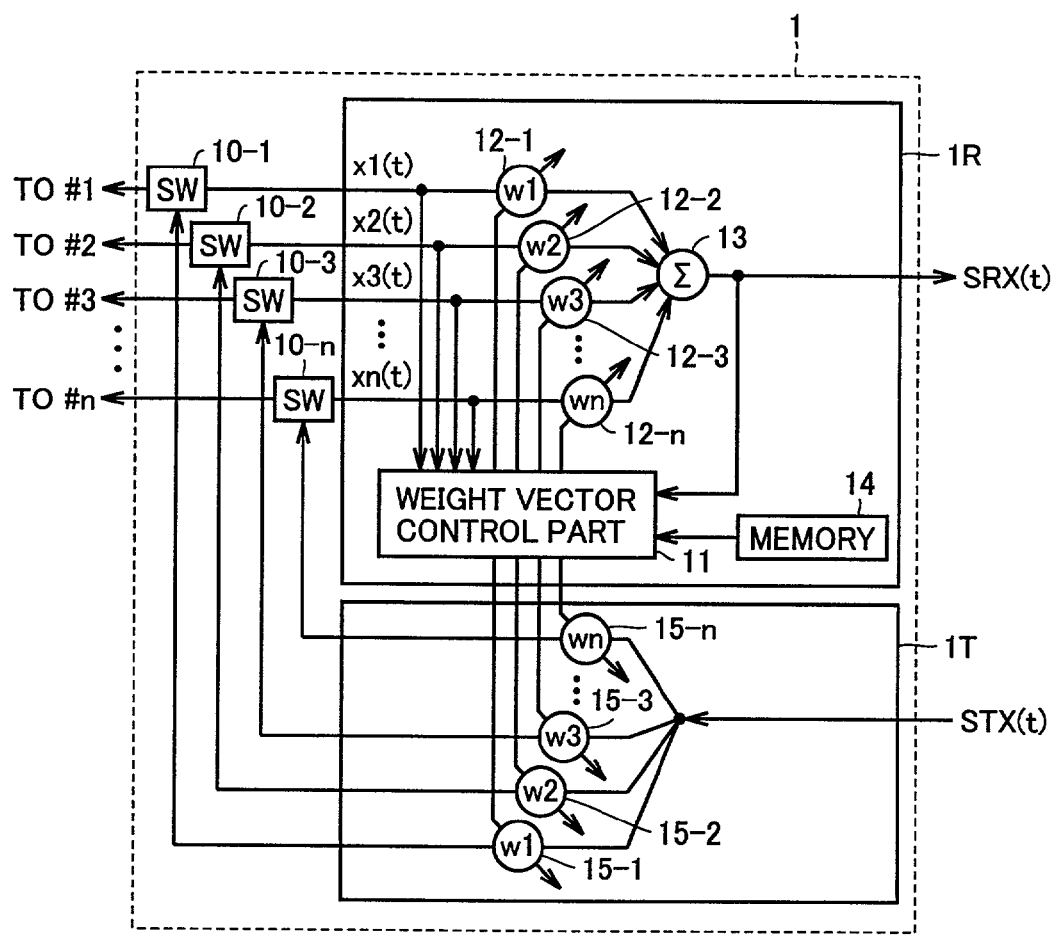
FIG. 17 is a schematic block diagram showing the structure of the adaptive array radio base station.
Figure 19:
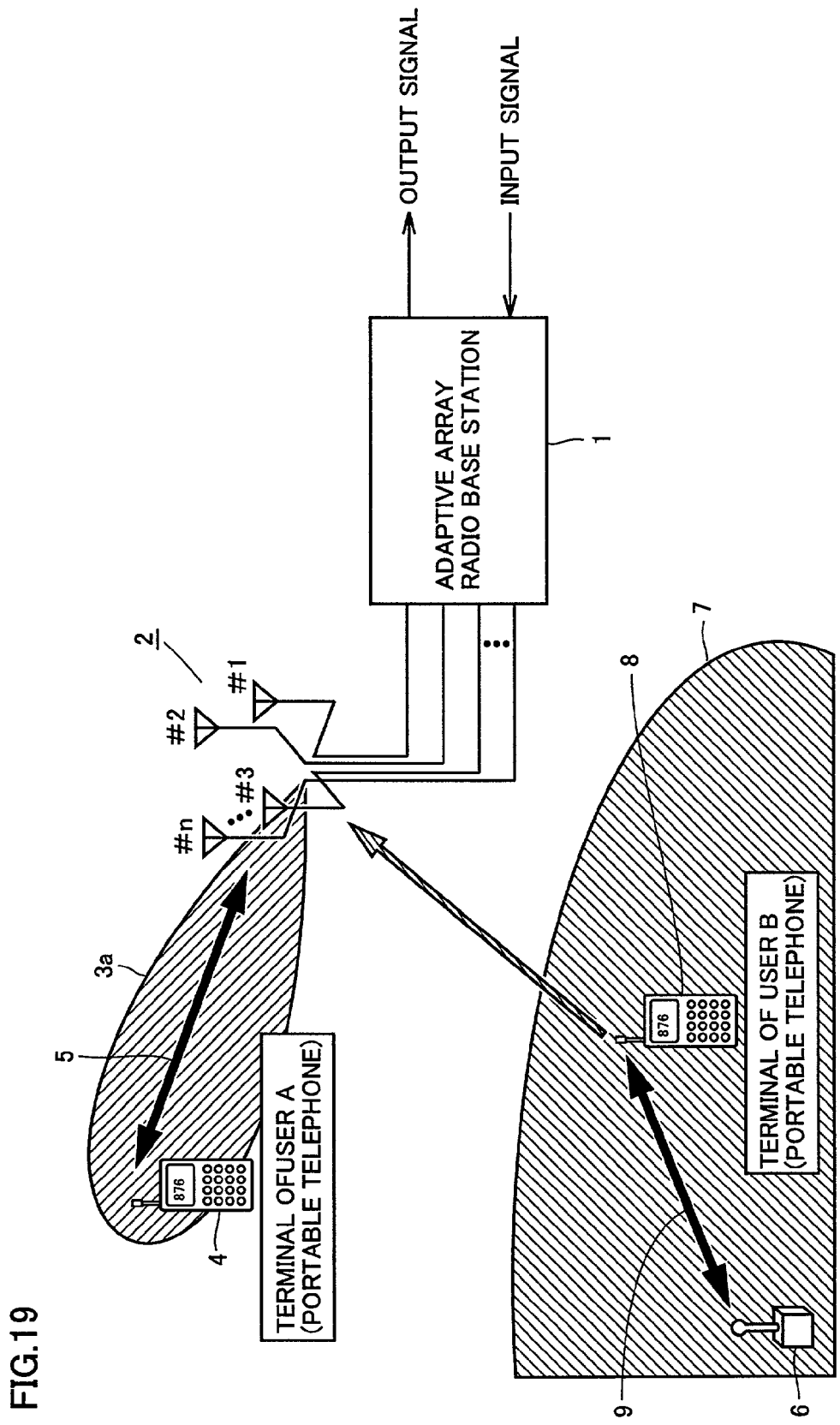
FIG. 19 is a model diagram imaging transfer of radio signals between the adaptive array radio base station and users.

In the radio apparatus of FIG. 1, a processor 100 serving as an antenna directivity control circuit includes a transmission directivity calculation part 100T and a receiving directivity calculation part 100R, and these basically correspond to the transmission part 1T and the receiving part 1R of the adaptive array radio base station shown in FIG. 17 respectively.

A digital transmit signal whose transmission directivity has been calculated and controlled in the transmission directivity calculation part 100T of FIG. 1 is converted to an analog transmit signal by a D/A converter 101, illustration of which has been omitted in the example of FIG. 17.

This analog transmit signal is subjected to necessary processing through a transmission RF circuit (x) 102 (x indicates that this is the radio system x) formed by an amplifier, a filter, a mixer etc., and thereafter transmitted from an antenna 104 through an antenna switch 103.

When saying "transmission circuit" in the following description, it is assumed to generically refer to the whole path reaching an input of the antenna switch 103 from an output of the D/A converter 101 through the transmission RF circuit 102 and component elements included therein.

On the other hand, a receive signal received in the antenna 104 is subjected to necessary processing in a receiving RF circuit (x) 105 formed by an amplifier, a filter, a mixer etc. through the antenna switch 103 and thereafter converted to a digital receive signal by an A/D converter 106, illustration of which has been omitted in the example of FIG. 17.

This digital receive signal is received by the receiving directivity control part 100R of the processor 100 serving as an antenna directivity control circuit, and its receiving directivity is calculated and controlled.

When saying "receiving circuit" in the following description, it is assumed to generically refer to the whole path reaching an input of the A/D converter 106 from an output of the antenna switch 103 through the receiving RF circuit 105 and component elements included therein.

As already described in relation to FIG. 17, a copy of a weight vector calculated by the receiving directivity calculation part 100R on the basis of the receive signal or an extrapolated weight vector is supplied to the transmission directivity calculation part 100T. Thus, transmission directivity of the transmit signal is controlled, and transmission/receiving of radio signals between a desired user and this radio base station with directivity is enabled.

At this point, it is assumed in FIG. 1 that the quantity of phase rotation of the "transmission circuit" of the x-th radio system (i.e., x=1 to 4) of radio systems present in four is $\Delta\theta\_TXx$, the quantity of its amplitude fluctuation is $\Delta AMP\_TXx$, the quantity of phase rotation of the "receiving circuit" is $\Delta\theta\_RXx$, and the quantity of its amplitude fluctuation is $\Delta AMP\_RXx$.

When the quantities of phase rotation are equal in the "transmission circuit" and the "receiving circuit", the following equation holds:

$$\Delta\theta\_TXx=\Delta\theta\_RXx, (x=1 \text{ to } 4)$$

When the quantities of amplitude fluctuation are equal in the "transmission circuit" and the "receiving circuit", the following equation holds:

$$\Delta AMP\_TXx=\Delta AMP\_RXx, (x=1 \text{ to } 4)$$

If such ideal conditions hold, correct transmission antenna directivity can be attained when employing the weight vector calculated on the receiving end as the weight vector of the transmitting end as such.

As hereinabove described, however, it follows that difference in quantity of phase rotation and difference in quantity of amplitude fluctuation take place between the transmit signal and the receive signal due to various characteristic difference between the "transmission circuit" and the "receiving circuit". It is necessary to obtain correction values for correcting such difference in quantity of phase rotation and difference in quantity of amplitude fluctuation, in order to attain correct antenna directivity.

Assuming that the correction value for the quantity of phase rotation is $\theta\_HOSEIx$ at this point, it can be obtained as:

$$\theta\_HOSEIx=\Delta\theta\_RXx-\Delta\theta\_TXx, (x=1 \text{ to } 4)$$

Assuming that the correction value for the quantity of phase rotation is $AMP\_HOSEIx$, it can be obtained as:

$$AMP\_HOSEIx=\Delta AMP\_RXx \div AMP0\_TXx,\\ (x=1 \text{ to } 4)$$

Correct antenna directivity can be attained by correcting the transmission directivity of the transmit signal with such correction values.

That is, the following correction is performed in relation to the quantity of phase rotation of the transmit signal:

$$\theta\_HOSEIx+\Delta\theta\_TXx=\Delta\theta\_RXx, (x=1 \text{ to } 4)$$

Then, the following correction is performed in relation to the quantity of amplitude fluctuation of the transmit signal:

$$AMP\_HOSEIx+\Delta AMP\_TXx=\Delta AMP\_RXx,\\ (x=1 \text{ to } 4)$$

Such a correction value θ_HOSEIx for the quantity of phase rotation and the correction value AMP_HOSEIx for the quantity of amplitude fluctuation are generated by a correction signal generation circuit 100H formed in the processor 100.

Figure 2:
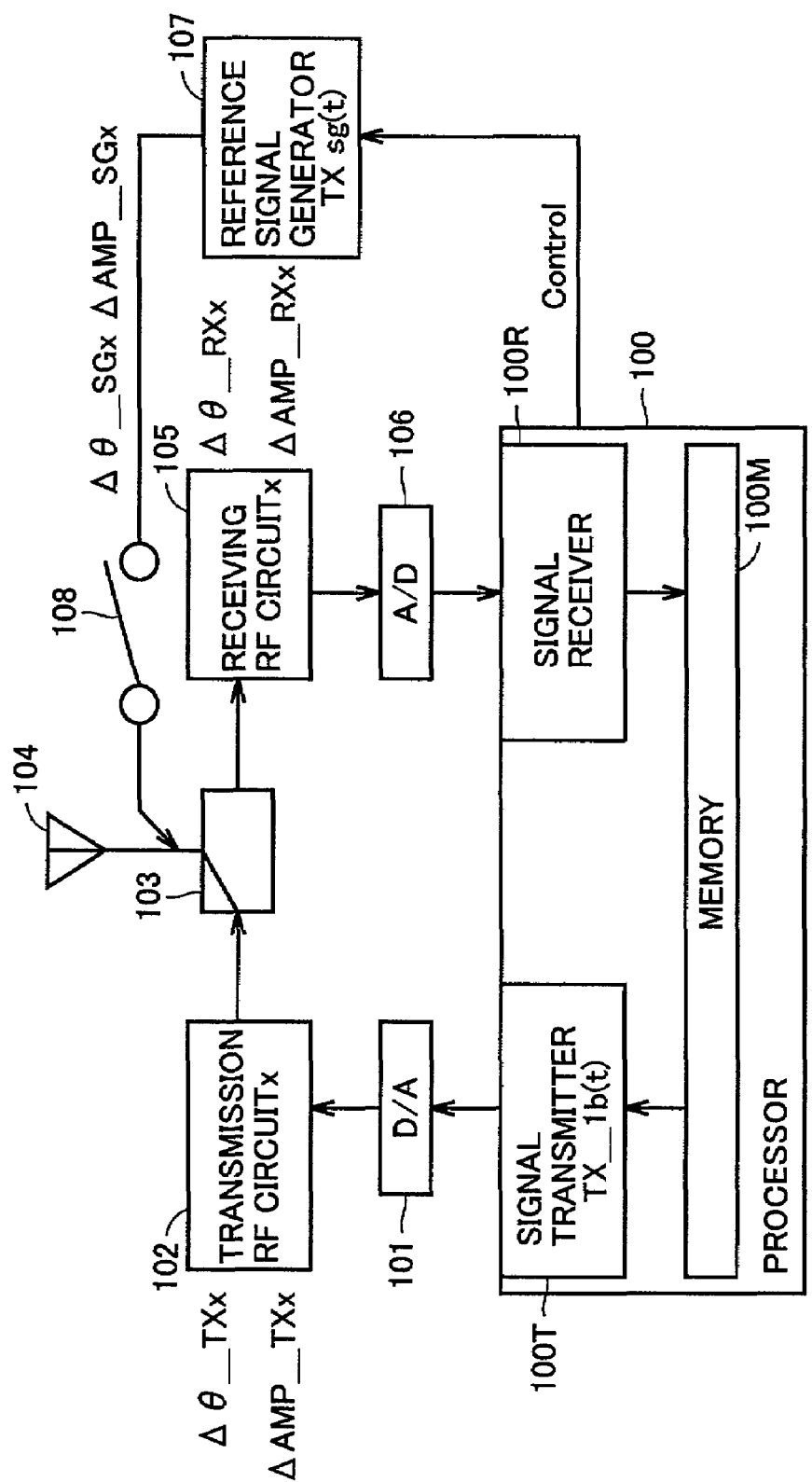
FIG. 2 is a schematic block diagram showing the hard structure of the radio apparatus according to the present invention.

Then, the hardware structure of the radio apparatus according to the embodiment of the present invention is described with reference to FIG. 2.

A digital transmit signal transmitted from the signal transmitter (transmission directivity calculation part) 100T forming the processor 100 is converted to an analog transmit signal by the D/A converter 101, and supplied to one input of the antenna switch 103 through the transmission RF circuit x. The antenna switch 103 functions to alternatively connect either the output of the transmission RF circuit x 102 or the input of the receiving RF circuit x 105 (in normal transmission/receiving), and also to straightly connect the output of the transmission RF circuit x 102 to the input of the receiving RF circuit x 105 in calibration described later. The signal from the antenna switch 103 is converted to a digital receive signal by the A/D converter 106 through the receiving RF circuit x 105, and supplied to the signal receiver (receiving directivity calculation part) 100R forming the processor 100.

Data necessary for operations in the transmission directivity calculation part 100T and the receiving directivity calculation part 100R are properly stored in a memory 100M.

According to the embodiment of the present invention, a reference signal generator 107 generating TX_sg(t) which is a prescribed reference signal is provided, and operations of this reference signal generator 107 are controlled by the processor 100. The reference signal generated from this reference signal generator 107 is further connected to a connecting portion between the antenna 104 and the antenna switch 103 through a prescribed path and a switch 108 (this path from the reference signal generator 107 is connected on a portion as close as possible to the antenna switch 103).

The quantity of phase rotation of the reference signal in this path from the output of the reference signal generator 107 up to the portion connected to the antenna 104 is Δθ_SGx, and the quantity of amplitude fluctuation of this path is ΔAMP_SGx.

This reference signal generator 107 may be provided for every radio system of a radio base station such as an adaptive array radio apparatus consisting of a plurality of radio systems, or may be provided by one for the overall radio base station including a plurality of radio systems.

In operations for correction value calculation described below, an operation for straightly passing the input of the transmission RF circuit x through the antenna switch 103 and making the same received in the receiving RF circuit x 105 is referred to as a loop back mode (LB mode), while an operation of receiving the reference signal generated from the reference signal generator 107 in the receiving RF circuit x 105 through the switch 108, the antenna 104 and the antenna switch 103 is referred to as a reference signal receiving mode (SG mode).

Figure 3:
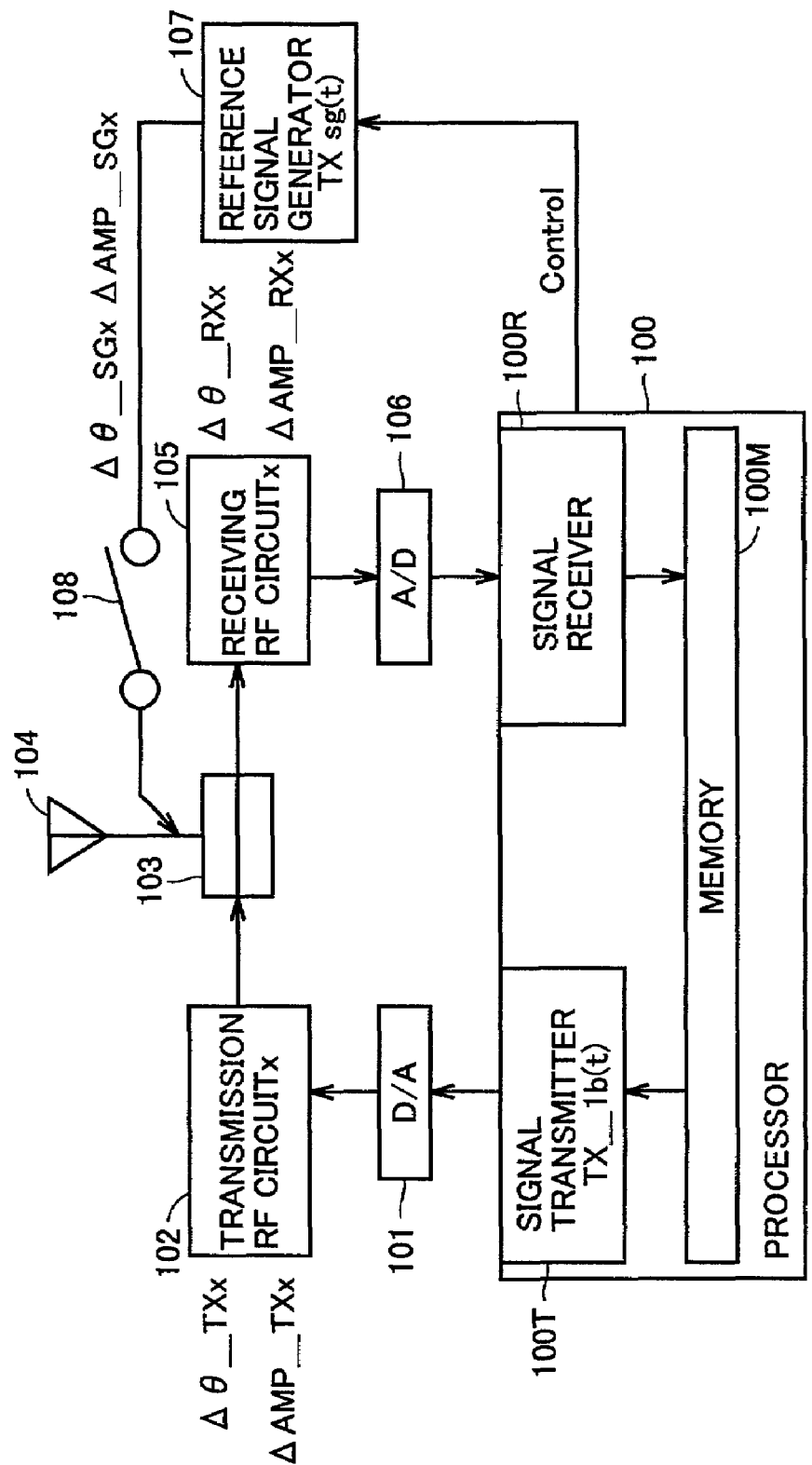
FIG. 3 is a schematic block diagram showing connective relation of a loop back mode of the radio apparatus according to the present invention.

First, a signal measuring operation by the loop back mode is described. FIG. 3 is a diagram showing connective relation for executing such an operation of the loop back mode. In this loop back mode, the output of the transmission RF circuit x straightly passes through the antenna switch 103 and is connected to the input of the receiving RF circuit x. On the other hand, the switch 108 provided on the path between the reference signal generator 107 and the antenna 104 is open, and the reference signal is not applied to the antenna 104.

Thus, the signal output from the signal transmitter 100T and passing through the "transmission circuit" and the "receiving circuit" is received in the signal receiver 100R, and the quantity of phase rotation and the quantity of amplitude fluctuation of the signal passing through both of the "transmission circuit" and the "receiving circuit" are calculated by the processor 100 and stored in the memory 100M. The calculation procedure for the quantity of phase rotation and the quantity of amplitude fluctuation in such a loop back system operation is now described.

First, assuming that the number of antenna elements of the adaptive array radio base station comprising the radio apparatus according to the present invention is N, signals output from the receiving circuits of the respective antennas are expressed in the following equations:

[Num 1]

$$RX_1(t) = h_{1lb} S_{lb}(t) + n_1(t)$$

$$RX_2(t) = h_{2lb} S_{lb}(t) + n_2(t)$$

. . .

$$RX_N(t) = h_{Nlb} S_{lb}(t) + n_2(t)$$

At this point, $RX_j(t)$ denotes a receive signal in a j-th antenna j=1, 2, . . . , N).

$S_{lb}(t)$ denotes a transmit signal.

$h_{jlb}$ denotes the complex coefficient of the transmit signal received in the j-th antenna.

$n_j(t)$ denotes noise included in the j-th receive signal. When expressing the above equations in vector notation, they become as follows:

[Num 2]

$$X(t) = H_{lb} S_{lb}(t) + N(t)$$

$$X(t) = [RX_1(t), RX_2(t), \ldots, RX_N(t)]^T$$

$$H_{lb} = [h_{1lb}, h_{2lb}, \ldots, h_{Nlb}]^T$$

$$N(t) = [n_1(t), n_2(t), \ldots, n_N(t)]^T$$

X(t) denotes an input signal vector $H_{lb}(t)$ denotes a receive signal vector of the transmit signal and N(t) denotes a noise vector.

At this point, $[\cdot]^T$ denotes transposition of $[\cdot]$.

At this point, the receive signal shown by the aforementioned input signal vector and the known transmit signal $S_{lb}(t)$ are multiplied in the processor 100 for calculating an ensemble average (time average).

Assuming that $E[\cdot]$ denotes the time average of $[\cdot]$, S*(t) denotes the conjugate complex number of S(t) and the average time is sufficiently long at this point, the following equations are obtained:

[Num 3]

$$E[X(t)S_{lb}*(t)] = H_{lb} E[S_{lb}(t)S_{lb}*(t)] + E[N(t)S_{lb}*(t)] \quad \text{(i)}$$

If the average time is sufficiently long, $$E[S_{lb}(t)S_{lb}*(t)] = 1 \quad \text{(ii)}$$

$$E[N(t)S_{lb}*(t)] = 0 \text{ (since there is no correlation between } S_{rx1}(t) \text{ and N(t) noise signal)} \quad \text{(iii)}$$

From the equations (i), (ii) and (iii), a response vector $H_{lb}$ of the transmit signal is:

$$E[X(t)S_{lb}(t)] = H_{lb}$$

$H_{lb}$ is generally expressed in a complex number:

$$H_{lb}=[h_{1lb}, h_{2lb}, \ldots, h_{Nlb}]^T$$

Figure 4:
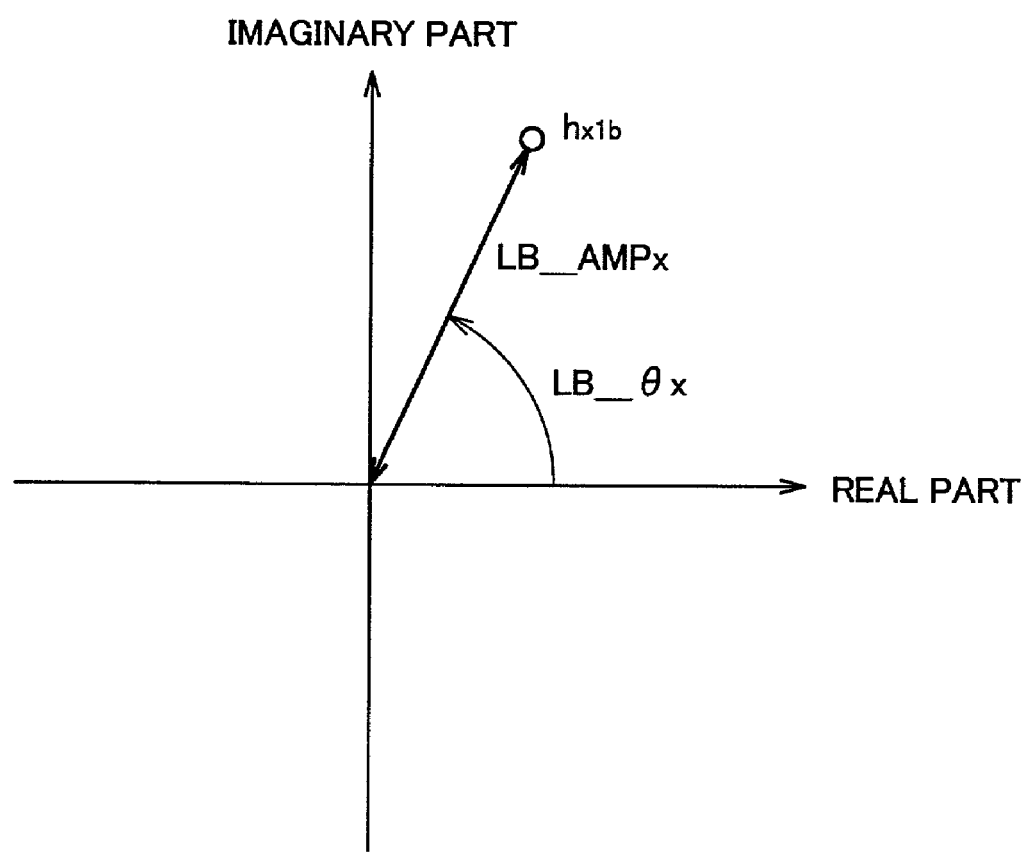
FIG. 4 is a diagram showing a graph for obtaining the phase and the amplitude of a receive signal according to the present invention.

Consequently, a quantity LB_θx of phase rotation and a quantity LB_AMPx of amplitude fluctuation of the receive signal of the loop back mode in a certain radio system x are obtained as follows, as obvious from FIG. 4:

$$LB\_AMPx=|h_{xlb}|$$

$$LB\_\theta x=\text{Tan}^{-1}(Im\{h_{xlb}\}/Re\{h_{xlb}\})$$

Then, the operation of the reference signal receiving mode according to the embodiment of the present invention is described. While the input of the transmission RF circuit x is connected to nowhere in the radio apparatus of the radio system x of this application shown in FIG. 5, the reference signal from the reference signal generator 107 controlled by the processor 100 is connected to the input of the receiving RF circuit x 105 through the switch 108, the antenna 104 and the antenna switch 103. When a modulated wave similar to the aforementioned transmit signal from the transmission circuit is output from this reference signal generator 107 and received in the receiving circuit, the quantity of phase rotation and the quantity of amplitude fluctuation of the reference signal are calculated by signal processing employing the aforementioned ensemble average. On the other hand, a calculation procedure for the quantity of phase rotation and the quantity of amplitude fluctuation in the case where a non-modulated wave is output from the reference signal generator and received in the receiving circuit is as follows: That is, when receiving and down-converting the non-modulated wave, respective receive signals to the x radio systems are expressed in the following equations:

[Num 4]

$$RX_1(t)=h_{1lb}+n_1(t)$$

$$RX_2(t)=h_{2lb}+n_2(t)$$

$$\ldots$$

$$RX_N(t)=h_{Nlb}+n_N(t)$$

When transmitting the signal with sufficient power, $h_{lb} \gg n_i(t)$, (i=1, 2, ..., N), and hence $$H_{lb}=[h_{1lb}, h_{2lb}, \ldots, h_{Nlb}]^T=[RX_1(t), RX_2(t), \ldots, RX_N(t)]^T$$

Therefore, it is possible to calculate the quantity SG_θx of phase rotation and the quantity SG_AMPx of amplitude fluctuation of the receive signal in the radio system x in the reference signal receiving mode on the basis of the following equations, and the calculation results are stored in the memory 100M of the processor 100:

$$SG\_AMPx=|RXx(t)|$$

$$SG\_\theta x=\text{Tan}^{-1}(Im\{RXx(t)\}/Re\{RXx(t)\})$$

A calculation method for correction values for the quantity of phase rotation and the quantity of amplitude fluctuation of the transmission/receiving systems according to the radio apparatus of the embodiment of the present invention is now described in detail. When schematically describing, this calculation method for the correction values is as follows:

First, the quantity of phase rotation and the quantity of amplitude fluctuation of the signal passing through the "transmission circuit" and the "receiving circuit" are calculated and stored by the aforementioned operation of the loop back mode, while calculating and storing the quantity of phase rotation and the quantity of amplitude fluctuation of the signal caused by the operation of the reference signal receiving mode. The quantity of phase rotation and the quantity of amplitude fluctuation caused in the "receiving circuit" by the reference signal are calculated by previously measuring and subtracting the fixed quantity of phase rotation and the quantity of amplitude fluctuation in the path from the reference signal generator to the antenna switch from the quantity of a phase rotation and the quantity of amplitude fluctuation in the reference signal receiving mode, and these are subtracted from the quantity of phase rotation and the quantity of amplitude fluctuation obtained by the loop back mode operation. Thus, the quantity of phase rotation and the quantity of amplitude fluctuation caused in the "transmission circuit" can be obtained, for calculating the difference between both from the previously obtained quantity of phase rotation and quantity of amplitude fluctuation of the "receiving circuit" and employing the same as the correction values in transmission in the "transmission circuit".

The calculation method for the correction values is now described in more detail.

[Procedure 1 Table Creation]

As a pre-stage for such a correction value calculation procedure, it is first necessary to previously measure a certain quantity of phase rotation and a certain quantity of amplitude fluctuation from the output of the reference signal generator 107 up to a point where the path of the reference signal connects to the antenna switch 103. Such measurement is performed once before shipping of products, and the obtained results are previously stored in the memory.

More in detail, the quantity Δθ_SGx of phase rotation and the quantity ΔAMP_Sgx of amplitude fluctuation from the reference signal generator provided by one for the radio base station consisting of a plurality of radio systems or every radio system up to the junction part of the path of the reference signal to the antenna 104 are previously measured indoors before shipping with a measuring apparatus such as a network analyzer, for example, and recorded in the memory 100M in the processor 100 as known values.

$$\Delta\theta\_SGx=\text{known}, (x=1-4) \qquad (1)$$

$$\Delta AMP\_SGx=\text{known}, (x=1-4) \qquad (2)$$

[Procedure 2 Measurement 1=Loop Back Mode]

The loop back operation mode shown in FIG. 3 is formed in all radio systems forming the radio base station and a transmit signal of a fixed transmission pattern is transmitted from the signal transmitter for receiving the same in the signal receiver through the "transmission circuit" and the "receiving circuit", thereby measuring the quantity of phase rotation and the quantity of amplitude fluctuation in the sum of the "transmit signal" and the "receive signal" (i.e., from the output of the D/A converter 101 to the input of the A/D converter 106). That is, the quantity of phase rotation and the quantity of amplitude fluctuation are obtained by an operation method employing the aforementioned ensemble average as follows:

$$LB\_\theta x=\Delta\theta\_TXx+\Delta\theta\_RXx \qquad (3)$$

$$LB\_AMPx=\Delta AMP\_TXx \times \Delta AMP\_RXx \qquad (4)$$

[Procedure 3 Measurement 2=Reference Signal Receiving Mode]

Figure 5:
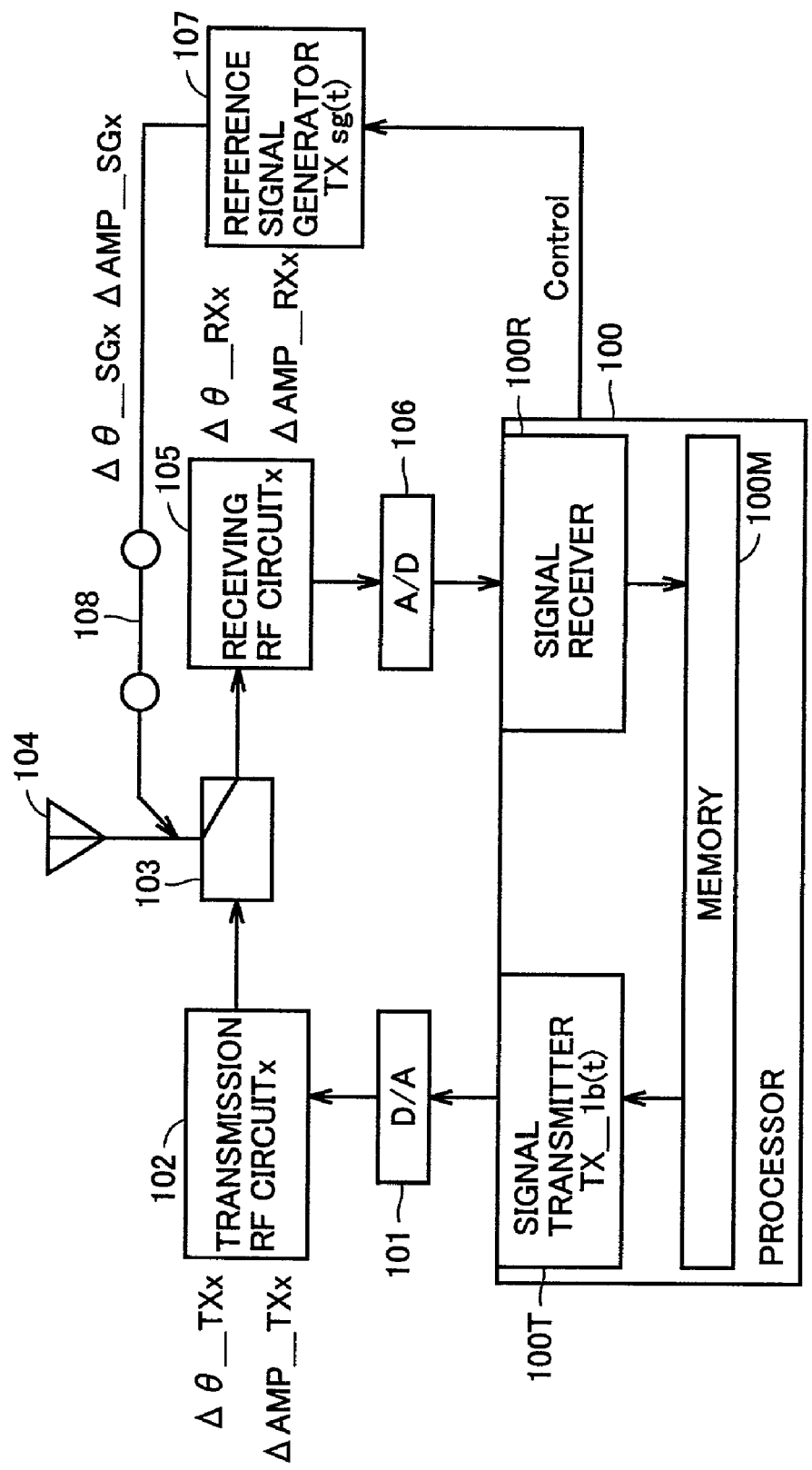
FIG. 5 is a schematic block diagram showing connective relation of a reference signal receiving mode of the radio apparatus according to the present invention.

The quantity of phase rotation and the quantity of amplitude fluctuation of the "receiving circuit" can be measured by making the reference signal generated from the reference signal generator 107 and receiving the signal in a specified "receiving circuit", as shown in FIG. 5. That is, the following results are obtained by the aforementioned calculation formulas:

$$SG\_\theta x = \Delta\_SGx + \Delta\theta\_RXx \quad (5)$$

$$SG\_AMPx = \Delta AMP\_SGx \times \Delta AMP\_RXx \quad (6)$$

[Procedure 4 Calculation]

The above four equations (3) to (6) are obtained by the two types of measurement of the loop back mode and the reference signal receiving mode, and hence the quantity of phase rotation and the quantity of amplitude fluctuation of the "transmission circuit" are obtained from these equations, and the correction values for the quantity of phase rotation and the quantity of amplitude fluctuation can be obtained.

First, the quantity of phase rotation of the "transmission circuit" is obtained when subtracting the quantity of phase rotation of the "receiving circuit" from the quantity of phase rotation in the loop back mode. That is, $$\Delta\theta\_TXx = LB\_\theta x - \Delta\theta\_RXx = LB\_\theta x - (SG\_\theta x - \Delta\theta\_SGx) = LB\_\theta x + \Delta\theta\_SGx - SG\_\theta x \quad (7)$$

Similarly, the quantity of amplitude fluctuation in the "transmission circuit" is obtained by dividing the quantity of amplitude fluctuation in the loop back mode by the quantity of amplitude fluctuation in the "receiving circuit" as follows:

$$\Delta AMP\_TXx = LB\_AMPx \div \Delta AMP\_RXx = LB\_AMPx \div (SG\_AMPx \div \Delta AMP\_SGx) = LB\_AMPx \times \Delta AMP\_SGx \div SG\_AMPx \quad (8)$$

Therefore, the correction value for the quantity of phase rotation is expressed as $\theta\_HOSEIx = \Delta\theta\_RXx - \Delta\theta\_TXx$, and when substituting the contents of the above expression (5) and the expression (7) therein, $\theta\_HOSEIx = (SG\_\theta x - \Delta\theta\_SGx) - (LB\_x + \Delta\theta\_SGx - SG\_\theta x)$ is obtained.

Arranging this equation, the following equation is finally obtained:

$$\theta\_HOSEIx = 2 \times SG\_\theta x - 2 \times \Delta\theta\_SGx - LB\_\theta x \quad (9)$$

On the other hand, the correction value for the quantity of amplitude fluctuation is expressed as $AMP\_HOSEIx = \Delta AMP\_RXx \div \Delta AMP\_TXx$. When substituting the contents of the above expression (6) and the expression (8) at this point, it becomes $AMP\_HOSEIx = (SG\_AMPx \div \Delta AMP\_SGx) \div (LB\_AMPx \times \Delta AMP\_SGx \div SG\_AMPx)$. Arranging this, the following correction value is finally obtained:

$$AMP\_HOSEIx = SG\_AMPx \times SG\_AMPx \div \Delta AMP\_SGx \div \Delta AMP\_SGx \div LB\_AMPx \quad (10)$$

Such calculation of the correction value $\theta\_HOSEIx$ for the quantity of phase rotation and the correction value $AMP\_HOSEIx$ for the quantity of amplitude fluctuation is executed by the processor 100 in a software manner in practice. FIG. 6 to FIG. 9 and FIG. 11 to FIG. 14 are flow charts of respective embodiments implementing correction value calculation operations of the present invention in a software manner.

The correction value calculation processing by each embodiment described below, i.e., calibration of antenna directivity is automatically executed during operations of the adaptive array radio base station at certain time intervals about several times a day, for example. This is because various conditions such as the temperature vary with the time within a day and characteristics etc. of circuit elements also change in response thereto.

On the other hand, it is assumed that the quantity of phase rotation and the quantity of amplitude fluctuation in the reference signal path from the output of the reference signal generator 107 up to the antenna 104 are previously measured with a measuring apparatus before shipping of the radio apparatus and stored in a table of the memory 100M of the arithmetic circuit 100, as described above [procedure 1]. This measuring operation is performed only before shipping and not performed in each calibration (in correction value calculation), and hence not included in each flow chart described below.

Embodiment 1

Figure 6:
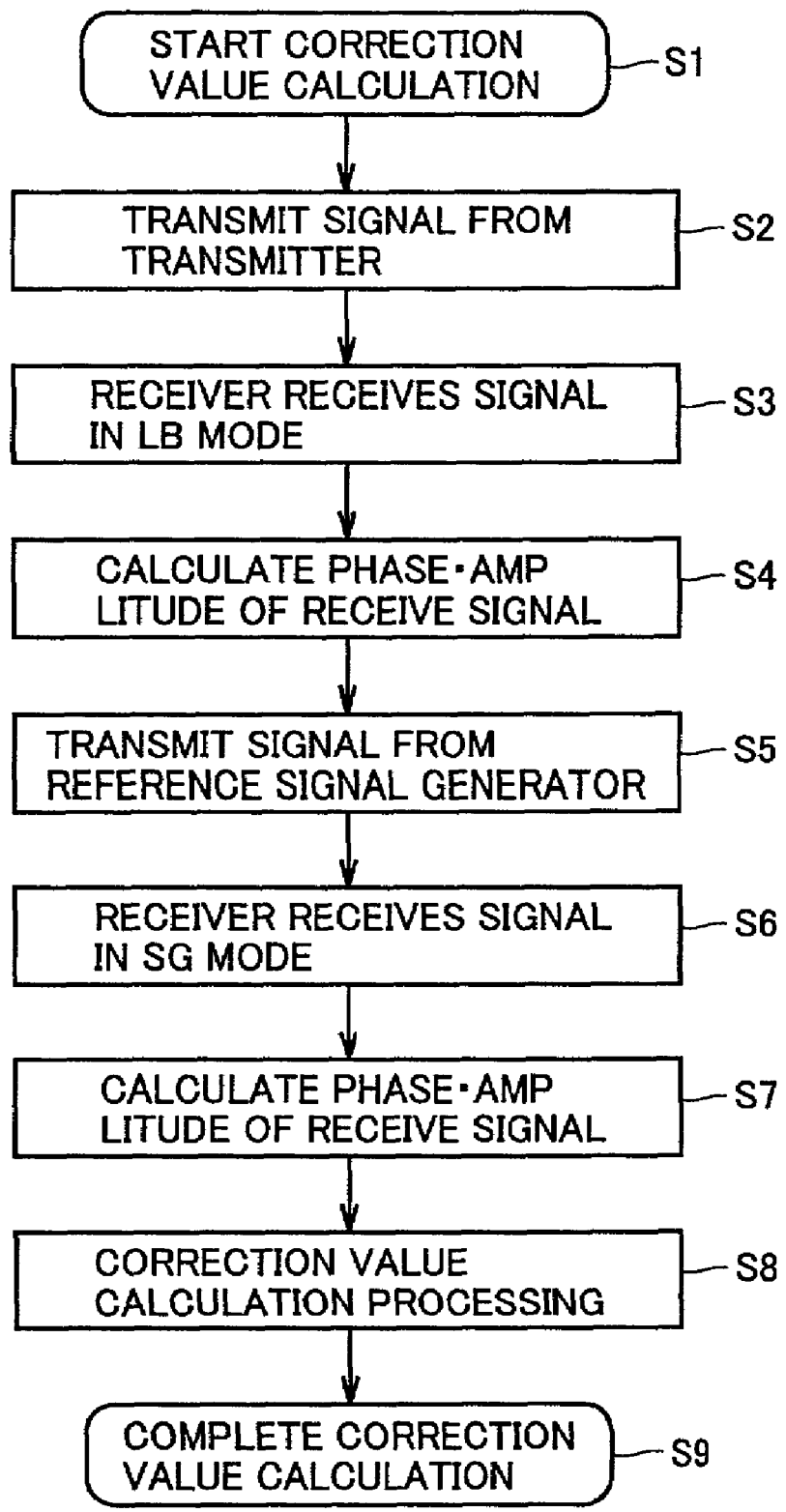
FIG. 6 is a flow chart showing correction value calculation processing according to an embodiment 1 of the present invention.

FIG. 6 is a flow chart showing correction value calculation processing according to an embodiment 1 of the present invention.

First, start of correction value calculation is instructed by the processor 100 (step S1).

The connective relation (FIG. 3) of the aforementioned loop back mode is executed under control of the processor 100, and a signal is transmitted from the signal transmitter 100T and the D/A converter 101 (step S2).

The transmitted signal passes through both of the "transmission circuit" and the "receiving circuit" in the loop back mode, and is received in the A/D converter 106 and the signal receiver 100R (step S3).

The processor 100 calculates the quantity of phase rotation (equation (3)) and the quantity of amplitude fluctuation (equation (4)) of the signal received through the loop back mode by the aforementioned [procedure 2] and stores the same in the memory 100M (step S4).

Then, the connective relation (FIG. 5) of the aforementioned reference signal receiving mode is executed under control of the processor 100, and a reference signal is transmitted from the reference signal generator 107 (step S5).

The transmitted reference signal passes through the "receiving circuit" in the reference signal receiving mode, and is received in the AID converter 106 and the signal receiver 100R (step S6).

The processor 100 calculates the quantity of phase rotation (equation (5)) and the quantity of amplitude fluctuation (equation (6)) of the signal received through the reference signal receiving mode by the aforementioned [procedure 3] and stores the same in the memory 100M (step S7).

Then, it calculates the correction value $\theta\_HOSEIx$ for the quantity of phase rotation and the correction value $AMP\_HOSEIx$ for the quantity of amplitude fluctuation by the aforementioned [procedure 4] on the basis of the quantities of phase rotation and the quantities of amplitude fluctuation calculated at the steps S4 and S7 as well as the known quantity of phase rotation and the quantity of amplitude fluctuation from the reference signal generator 107 up to the antenna 104 having been previously measured before shipping (step S8).

Then, the processor 100 completes calculation of the correction values (step S9).

Thereafter correct antenna transmission directivity can be attained by previously correcting the quantity of phase rotation and the quantity of amplitude fluctuation of the transmit signal with the aforementioned correction values respectively. That is, it follows that calibration for attaining correct antenna directivity has been executed.

Embodiment 2

Figure 7:
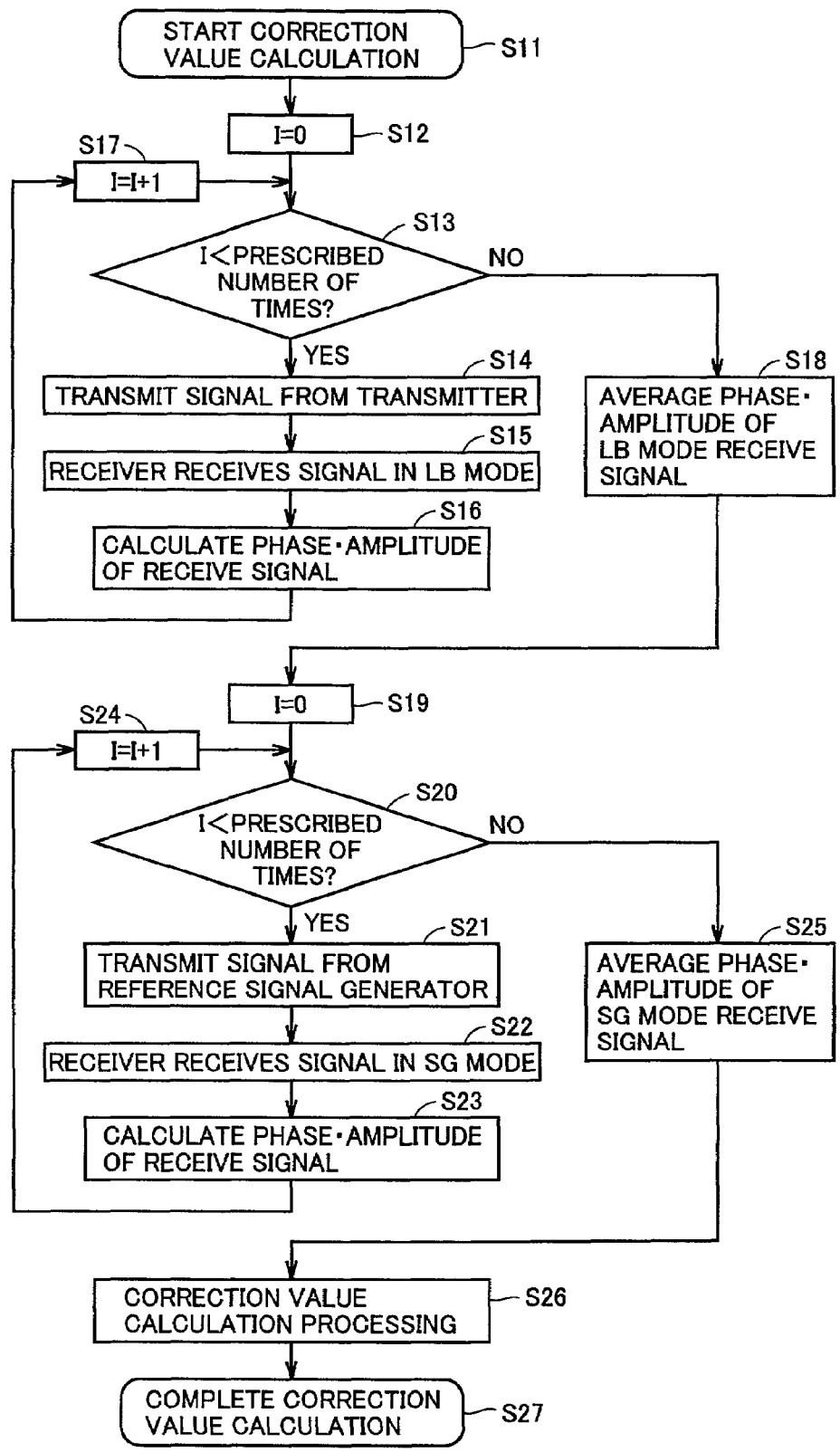
FIG. 7 is a flow chart showing correction value calculation processing according to an embodiment 2 of the present invention.

FIG. 7 is a flow chart showing correction value calculation processing according to an embodiment 2 of the present invention.

There may be a case where correct quantity of phase rotation and quantity of amplitude fluctuation of a receive signal are not necessarily obtainable when performing measurement once in the loop back mode and once in the reference signal receiving mode as the embodiment 1 of FIG. 6. Therefore, it is conceivable to perform measurement by an arbitrarily set number of times (about 4 to 10 times, for example) in both of the loop back mode and the reference signal receiving mode for performing calculation of the quantity of phase rotation and the quantity of amplitude fluctuation of the receive signal after averaging the results thereof, in order to attain improvement of measurement accuracy.

When correction value calculation start is instructed (step S11), a variable I is set to zero (step S12), and it is determined that I=0 does not reach a prescribed number of times (step S13) in the embodiment 2 of FIG. 7.

Consequently, calculation of the quantity of phase rotation and the quantity of amplitude fluctuation of the receive signal in the loop back mode according to the [procedure 2] is performed, and the results thereof are stored in the memory (steps S14 to S16). Then, the variable I is updated by 1 (step S17).

Thereafter calculation of the quantity of phase rotation and the quantity of amplitude fluctuation of the receive signal (steps S14 to S17) is repeated until it is determined that the variable I has exceeded the prescribed number of times, and when it is determined that the variable I has exceeded the prescribed number of times (step S13), respective average values of the quantities of phase rotation and the quantities of amplitude fluctuation having been theretofore calculated and stored are calculated (step S18).

Then, the variable I is set to zero again at a step S19, and it is determined that I=0 has not reached the prescribed number of times (step S20).

Consequently, calculation of the quantity of phase rotation and the quantity of amplitude fluctuation of the receive signal in the reference signal receiving mode according to the [procedure 2] is performed and stored in the memory (steps S21 to S23), and the variable I is updated by 1 (step 24).

Thereafter calculation of the quantity of phase rotation and the quantity of amplitude fluctuation of the receive signal (steps S21 to S24) is repeated until it is determined that the variable I has exceeded the prescribed number of times, and when it is determined that the variable I has exceeded the prescribed number of times (step S20), respective average values of the quantities of phase rotation and the quantities of amplitude fluctuation having been theretofore calculated and stored are calculated (step S25).

Then, the correction value θ_HOSEIx for the quantity of phase rotation and the correction value AMP_HOSEIx for the quantity of amplitude fluctuation are calculated by the aforementioned [procedure 4] on the basis of the quantity of phase rotation and the quantity of amplitude fluctuation having been averaged and stored at the steps S18 and S25 and on the basis of the quantity of phase rotation and the quantity of amplitude fluctuation from the reference signal generator 107 up to the antenna 104 having been previously measured before shipping (step S26).

Then, the processor 100 completes calculation of the correction values (step S27).

Embodiment 3

Figure 8:
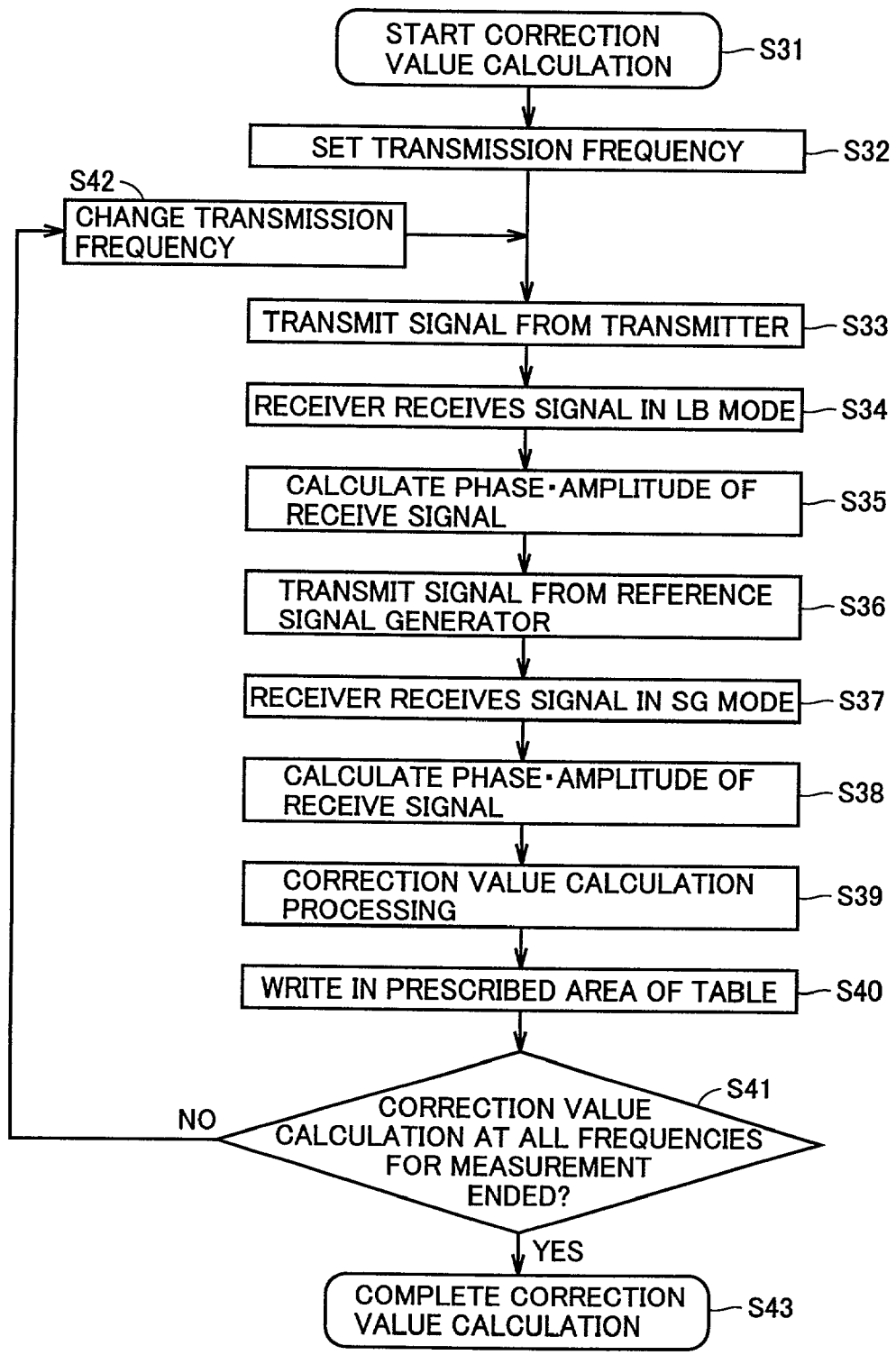
FIG. 8 is a flow chart showing correction value calculation processing according to an embodiment 3 of the present invention.

FIG. 8 is a flow chart showing correction value calculation processing according to an embodiment 3 of the present invention.

In general, there is such a tendency that characteristics of phases and amplitudes of amplifiers, filters, mixers etc. included in a "transmission circuit" and a "receiving circuit" change depending on the frequency of a transmit signal.

In order to improve accuracy of measurement of the correction values, therefore, it is desirable to perform measurement in the loop back mode and measurement in the reference signal receiving mode in the respective ones of a plurality of transmission frequencies and to calculate correction values for the respective ones of the plurality of transmission frequencies.

When calculation start for the correction values is instructed by the processor 100 (step S31), a desired transmission frequency $f_1$ is first set (step S32) in the embodiment 3 of FIG. 8. Thereafter steps S33 to S39 which are the same processing as the steps S2 to S8 of the embodiment 1 of FIG. 6 are executed, and respective correction values θ_HOSEIx and AMP_HOSEIx for the quantity of phase rotation and the quantity of amplitude fluctuation of the receive signal with respect to the transmission frequency $f_1$ are calculated. These calculated correction values are written in a prescribed area of the table in the memory 100M (step S40).

When measurement at all prescribed transmission frequencies is not completed (step S41), it changes the transmission frequency to a next frequency $f_2$ (step S42), similarly repeats the steps S33 to S39, calculates correction values for the quantity of phase rotation and the quantity of amplitude fluctuation for the transmission frequency $f_2$ and writes the same in a prescribed area of the table in the memory 100M (step S40).

It repeats calculation and storage of the quantity of phase rotation and the quantity of amplitude fluctuation while thus changing the transmission frequency, and when it is determined that measurement at all transmission frequencies has been ended (step S41), the processor 100 completes calculation of the correction values (step S43).

Embodiment 4

Figure 9:
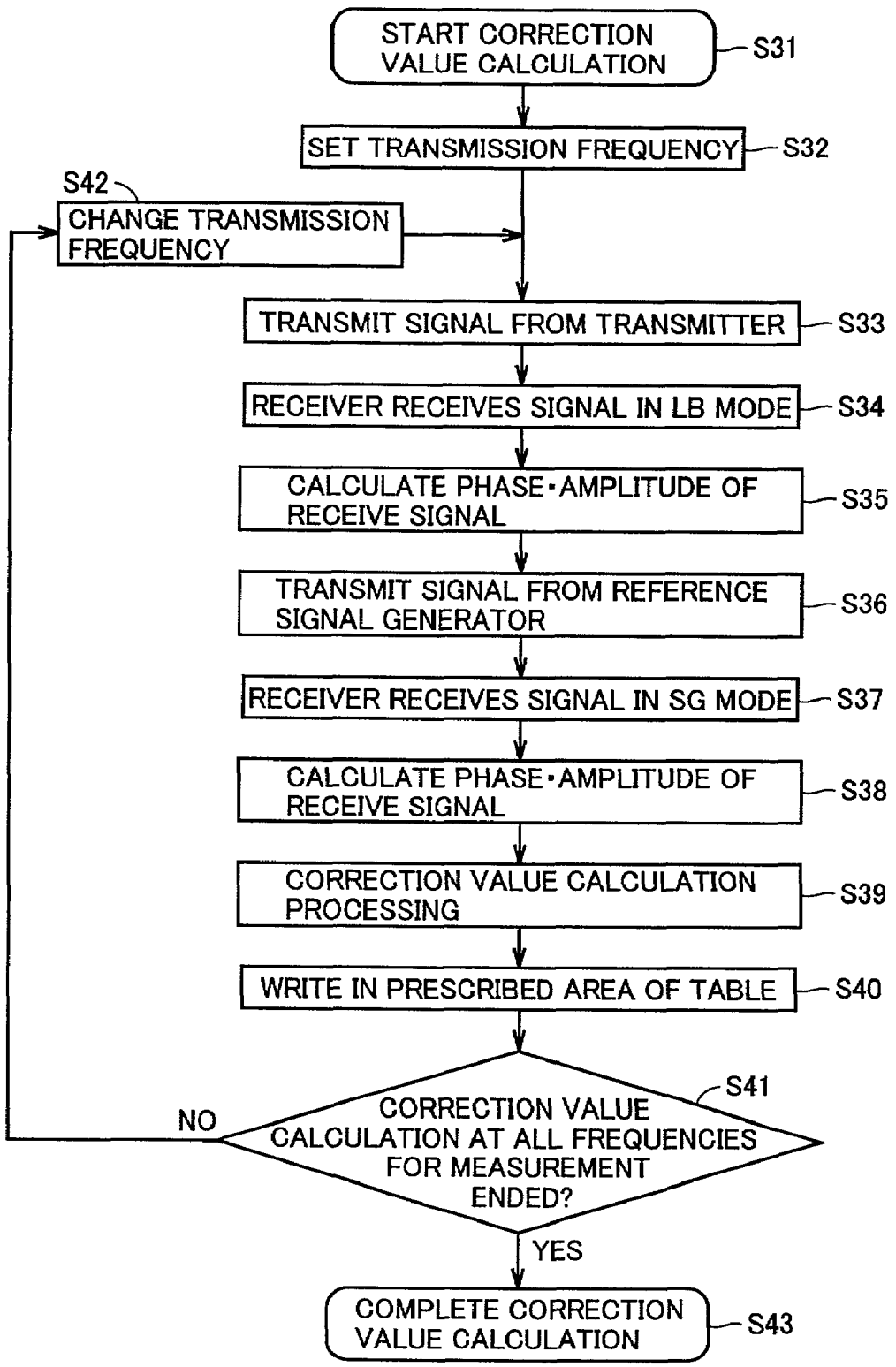
FIG. 9 is a flow chart showing correction value calculation processing according to an embodiment 4 of the present invention.

FIG. 9 is a flow chart showing correction value calculation processing according to an embodiment 4 of the present invention.

In the aforementioned embodiment 3, it has been so formed as to obtain the correction values for the quantity of phase rotation and the quantity of amplitude fluctuation for the respective ones of a plurality of predetermined transmission frequencies and store the same in a prescribed area of the table in the memory 100M.

When the number of desired transmission frequencies to be measured is extremely large, however, there may be a case where it is not rational to perform measurement and calculation with respect to all transmission frequencies. In such a case, it is possible to perform measurement of the quantity of phase rotation and the quantity of amplitude fluctuation and calculation of correction values only with respect to representative transmission frequencies among the number of transmission frequencies to be measured and perform interpolation employing the results thereof thereby obtaining correction values for all desired transmission frequencies other than the aforementioned representative frequencies.

In the embodiment 4 of FIG. 9, it has added a step S44 of interpolation processing for correction values in addition to the processing of the embodiment 3 of FIG. 8. After calculation of correction values corresponding to all representative frequencies and writing in the table are ended at a step S41, correction values for other transmission frequencies are calculated by an interpolation method shown in FIG. 10.

Figure 10:
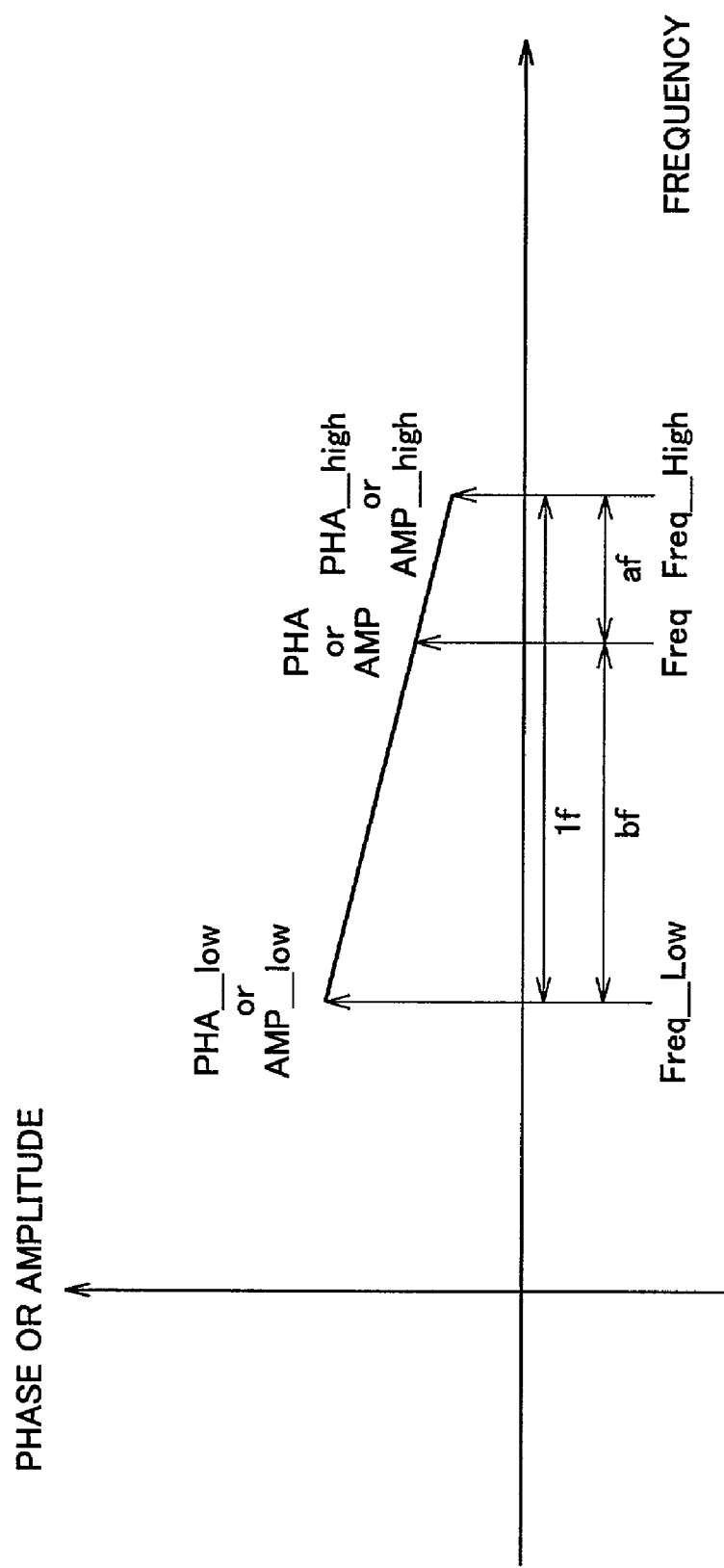
FIG. 10 is a graph diagram showing an interpolation method according to an embodiment 4 of the present invention.

The method of interpolation is now described with reference to a graph of FIG. 10.

It is assumed that a transmission frequency to be obtained in practice is Freq, and correction values for the quantity of phase rotation and the quantity of amplitude fluctuation at the frequency are PHA and AMP respectively.

At this point, it is assumed that one representative transmission frequency higher than this transmission frequency Freq is Freq_high, and one representative transmission frequency lower than this transmission frequency Freq is Freq_low. It is assumed that correction values for the quantity of phase rotation and the quantity of amplitude fluctuation obtained by measurement at Freq_high which is one representative frequency are PHA_high and AMP_high respectively, and correction values for the quantity of phase rotation and the quantity of amplitude fluctuation obtained by measurement at Freq_low which is another representative frequency are PHA_low and AMP_low respectively.

Under such conditions, the correction values PHA and AMP for the transmission frequency to be obtained are obtained by the interpolation shown in FIG. 10 as follows:

[Num 5]

$$lf = Freq\_High - Freq\_Low$$

$$af = Freq\_High - Freq$$

$$bf = Freq - Freq\_Low$$

$$PHA = (af*PHA\_low + bf*PHA\_high)/lf$$

$$AMP = (af*AMP\_low + bf*AMP\_high)/lf$$

Embodiment 5

Figure 11:
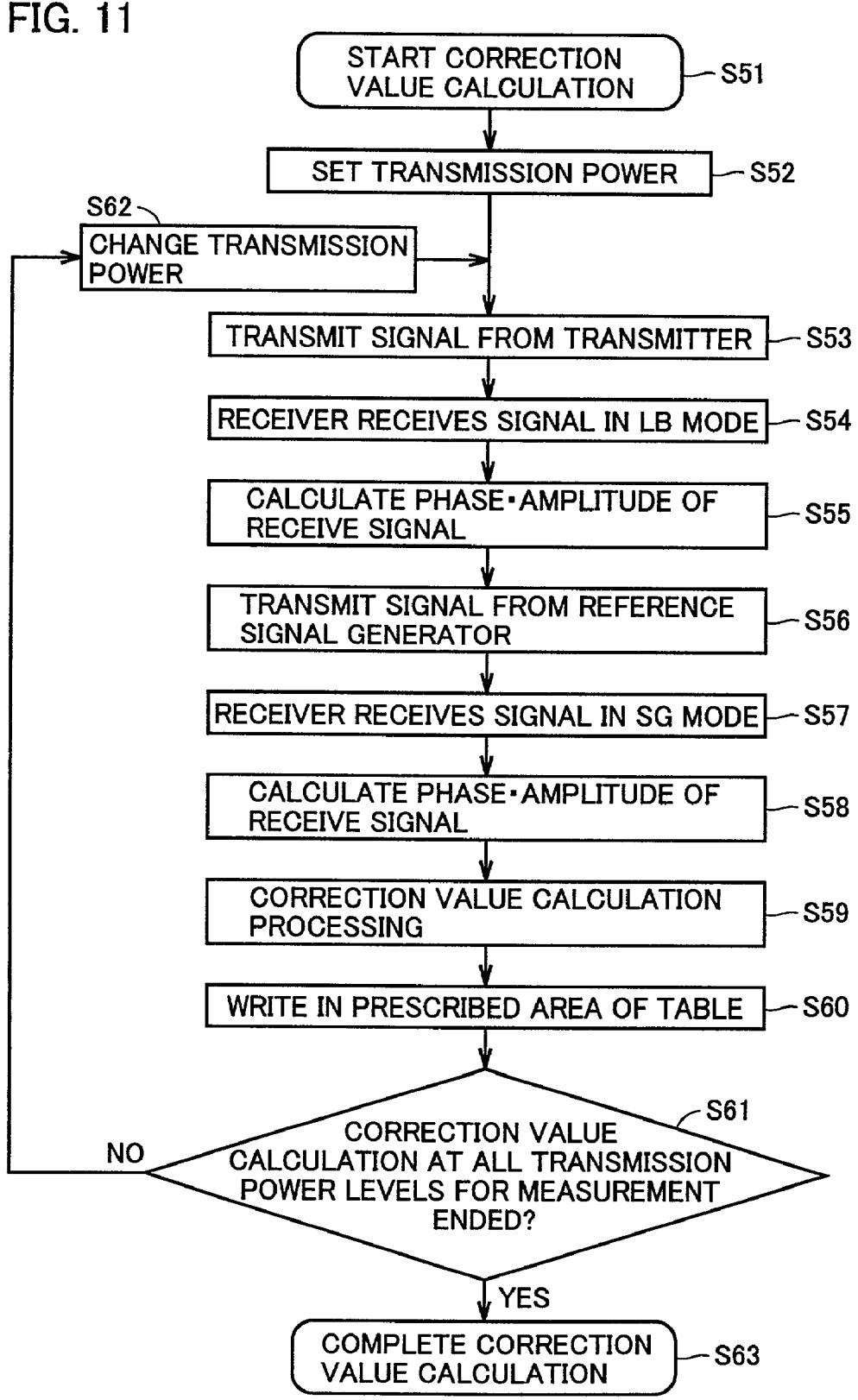
FIG. 11 is a flow chart showing correction value calculation processing according to an embodiment 5 of the present invention.

FIG. 11 is a flow chart showing correction value calculation processing according to an embodiment 5 of the present invention.

In general, there is such a tendency that characteristics of phases and amplitudes of amplifiers, filters, mixers etc. included in a "transmission circuit" and a "receiving circuit" change depending on the transmission power of a transmit signal.

In order to improve accuracy of measurement of the correction values, therefore, it is desirable to perform measurement in the loop back mode and measurement in the reference signal receiving mode in the respective ones of a plurality of transmission power levels and to calculate correction values for the respective ones of the plurality of transmission power levels.

When calculation start for the correction values is instructed by the processor 100 (step S51), desired transmission power $p_1$ is first set (step S52) in the embodiment 5 of FIG. 11. Thereafter steps S53 to S59 which are the same processing as the steps S2 to S8 of the embodiment 1 of FIG. 6 are executed, and respective correction values θ_HOSEIx and AMP_HOSEIx for the quantity of phase rotation and the quantity of amplitude fluctuation of the receive signal with respect to the transmission power $p_1$ are calculated at a step S59. These calculated correction values are written in a prescribed area of the table in the memory 100M (step S60).

When measurement at all prescribed transmission power levels is not completed (step S61), it changes the transmission power to next transmission power $p_2$ (step S62), similarly repeats the steps S53 to S59, calculates correction values for the quantity of phase rotation and the quantity of amplitude fluctuation for the transmission power $p_2$, and writes the same in a prescribed area of the table in the memory 100M (step S60).

It repeats calculation and storage of the quantity of phase rotation and the quantity of amplitude fluctuation while thus changing the transmission power, and when it is determined that measurement at all transmission power levels has been ended (step S61), the processor 100 completes calculation of the correction values.

Embodiment 6

Figure 12:
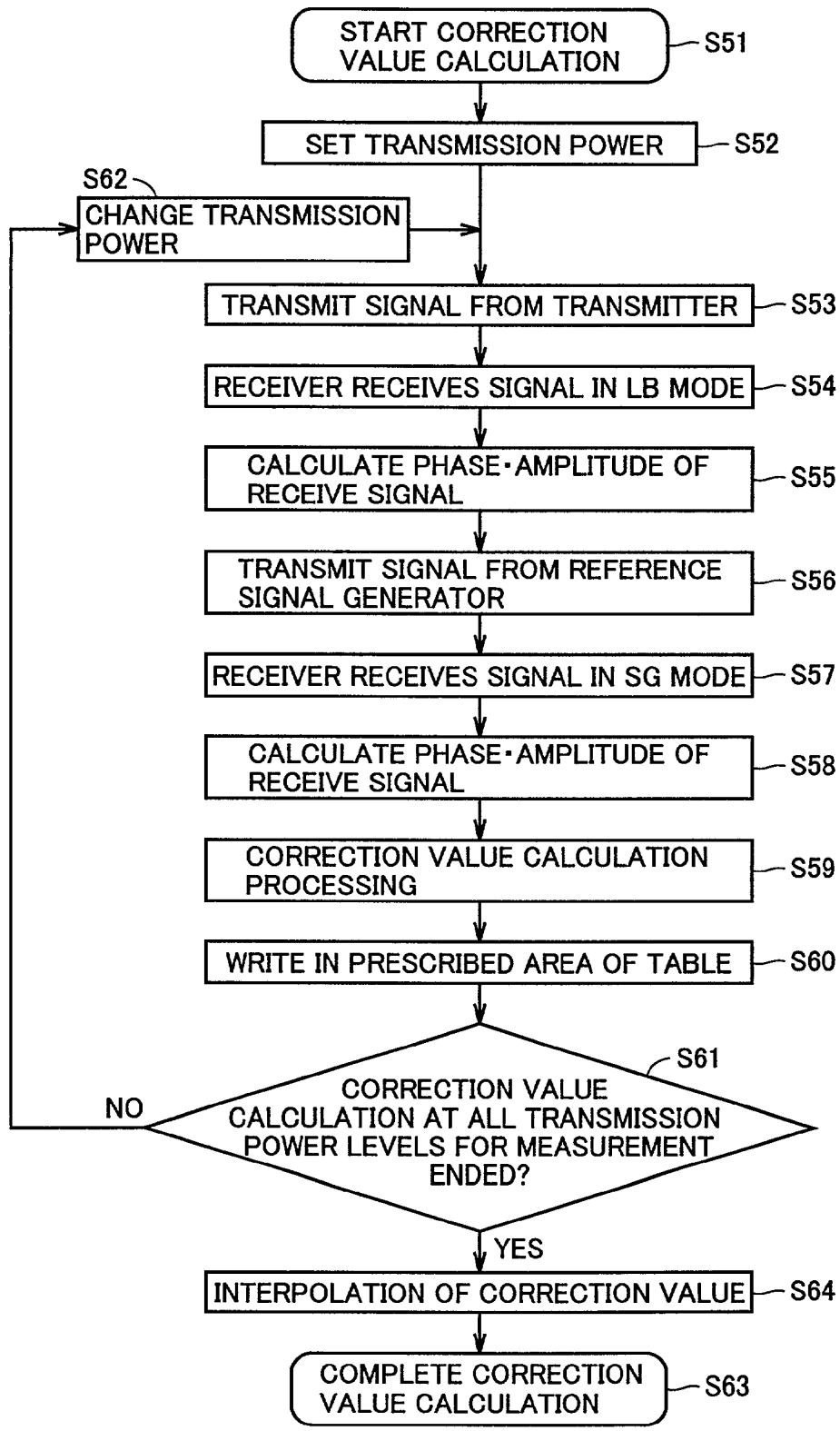
FIG. 12 is a flow chart showing correction value calculation processing according to an embodiment 6 of the present invention.

FIG. 12 is a flow chart showing correction value calculation processing according to an embodiment 6 of the present invention.

In the aforementioned embodiment 5, it has been so formed as to obtain the correction values for the quantity of phase rotation and the quantity of amplitude fluctuation for the respective ones of a plurality of predetermined transmission power levels and store the same in a prescribed area of the table in the memory 100M.

When the number of desired transmission power levels to be measured is extremely large, however, there may be a case where it is not rational to perform measurement and calculation with respect to all transmission power levels. In such a case, it is possible to perform measurement of the quantity of phase rotation and the quantity of amplitude fluctuation and calculation of correction values only with respect to representative transmission power levels among the number of transmission power levels to be measured and perform interpolation employing the results thereof thereby obtaining correction values for all desired transmission power levels other than the aforementioned representative power levels.

In the embodiment 6 of FIG. 12, it has added a step S64 of interpolation processing for correction values in addition to the embodiment 5 of FIG. 11. That is, after calculation of correction values for all representative transmission power levels and writing in the table are ended at a step S61, correction values for other transmission power levels are calculated by the interpolation method described above in relation to FIG. 10. The specific method of interpolation has been already described in detail with reference to FIG. 10 and hence it is not repeated at this point.

Embodiment 7

Figure 13:
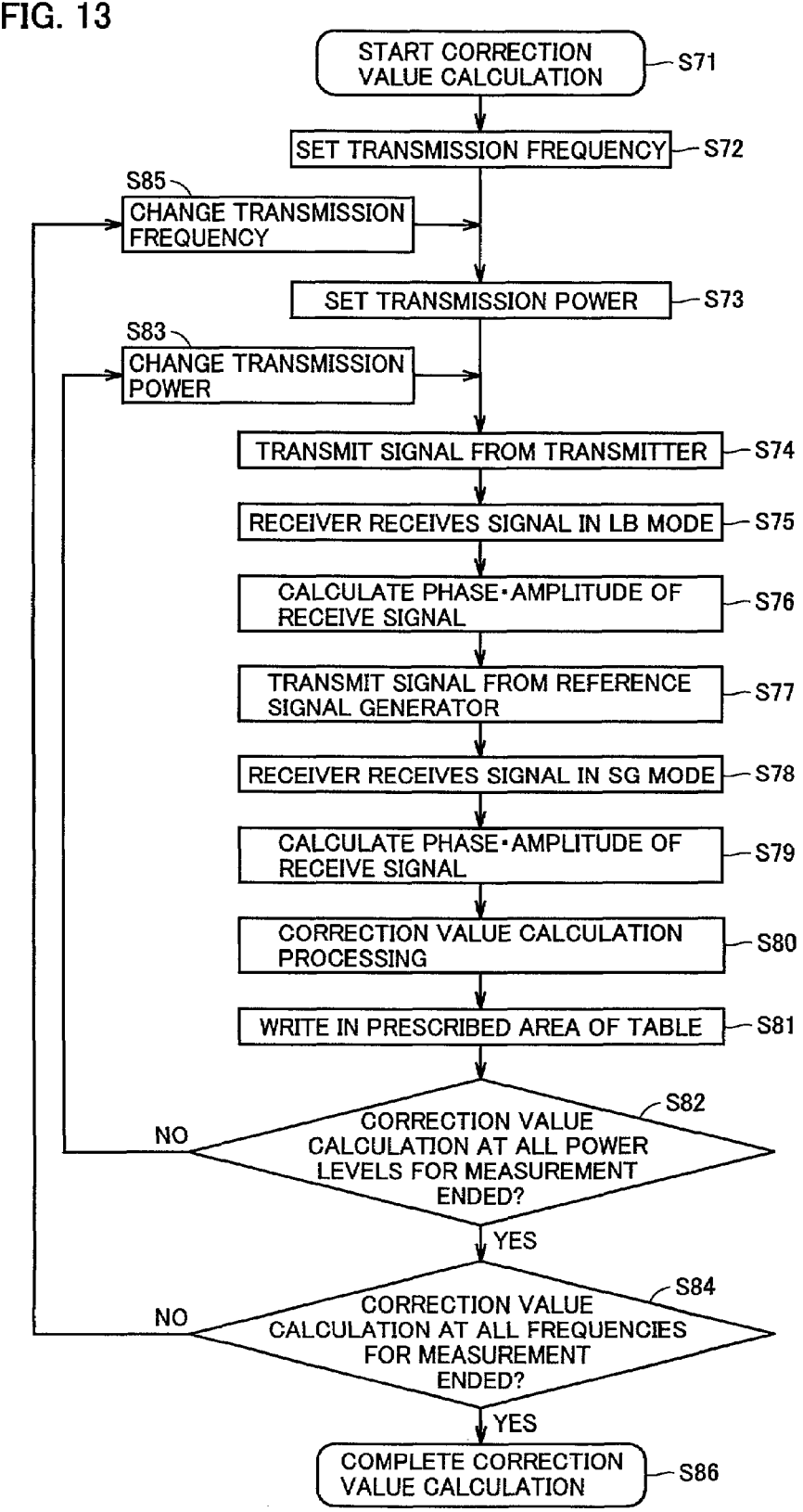
FIG. 13 is a flow chart showing correction value calculation processing according to an embodiment 7 of the present invention.

FIG. 13 is a flow chart showing correction value calculation processing according to an embodiment 7 of the present invention.

In general, there is such a tendency that characteristics of phases and amplitudes of amplifiers, filters, mixers etc. included in a "transmission circuit" and a "receiving circuit" change depending on the transmission frequency and the transmission power of a transmit signal.

In order to improve accuracy of measurement of the correction values, therefore, it is desirable to perform measurement in the loop back mode and measurement in the reference signal receiving mode in the respective combinations of a plurality of transmission frequencies and a plurality of transmission power levels and to calculate correction values for the quantity of phase rotation and the quantity of amplitude fluctuation for the respective combinations of the plurality of transmission frequencies and transmission power levels.

When calculation start for the correction values is instructed by the processor 100 (step S71), a desired transmission frequency $f_1$ is first set (step S72), and desired transmission power $p_1$ is further set (step S73) in the embodiment 7 of FIG. 13.

Thereafter steps S74 to S80 of the same processing contents as the steps S2 to S8 of the embodiment 1 of FIG. 6 are executed, and correction values θ_HOSEIx and AMP_HOSEIx for the quantity of phase rotation and the quantity of amplitude fluctuation with respect to the transmission frequency $f_1$ and the transmission power $p_1$ are calculated at a step S80. These calculated correction values are written in a prescribed area of the table in the memory 100M (step S81).

When measurement at all prescribed transmission power levels is not completed (step S82), it changes the transmission power to next power $p_2$ while fixing the transmission frequency $f_1$ (step S83), similarly repeats the steps S74 to S80, calculates correction values for the quantity of phase rotation and the quantity of amplitude fluctuation for the transmission frequency $f_1$ and the transmission power $p_2$, and writes the same in the prescribed area of the table in the memory 100M (step S81).

Thus, it repeats calculation and storage of the quantity of phase rotation and the quantity of amplitude fluctuation while fixing the transmission frequency and changing the transmission power, and when it is determined that measurement at all transmission power levels at the transmission frequency $f_1$ has been ended (step S82), it changes the transmission frequency $f_1$ to a next transmission frequency $f_2$ (step S85) if measurement for all prescribed transmission frequencies has not been completed (step S84), and sets the transmission power to $p_1$ again (step S83).

Thereafter it repeatedly executes the steps S74 to S80 while holding the transmission frequency $f_2$ and sequentially changing the transmission power, and when termination of measurement at all transmission power levels at the transmission frequency $f_2$ is determined (step S84), whether or not transmission for all prescribed transmission frequencies has been completed is determined (step S84).

If measurement for all transmission frequencies has not been terminated, it further changes the transmission frequency (step S85) and repeats the aforementioned measurement, and the processor 100 ends calculation of the correction values if it has been terminated (step S86).

Thereafter calibration implementing correct antenna directivity is enabled by previously correcting the quantity of phase rotation and the quantity of amplitude fluctuation of the transmit signal with correction values at the corresponding transmission frequency and transmission power respectively.

Embodiment 8

Figure 14:
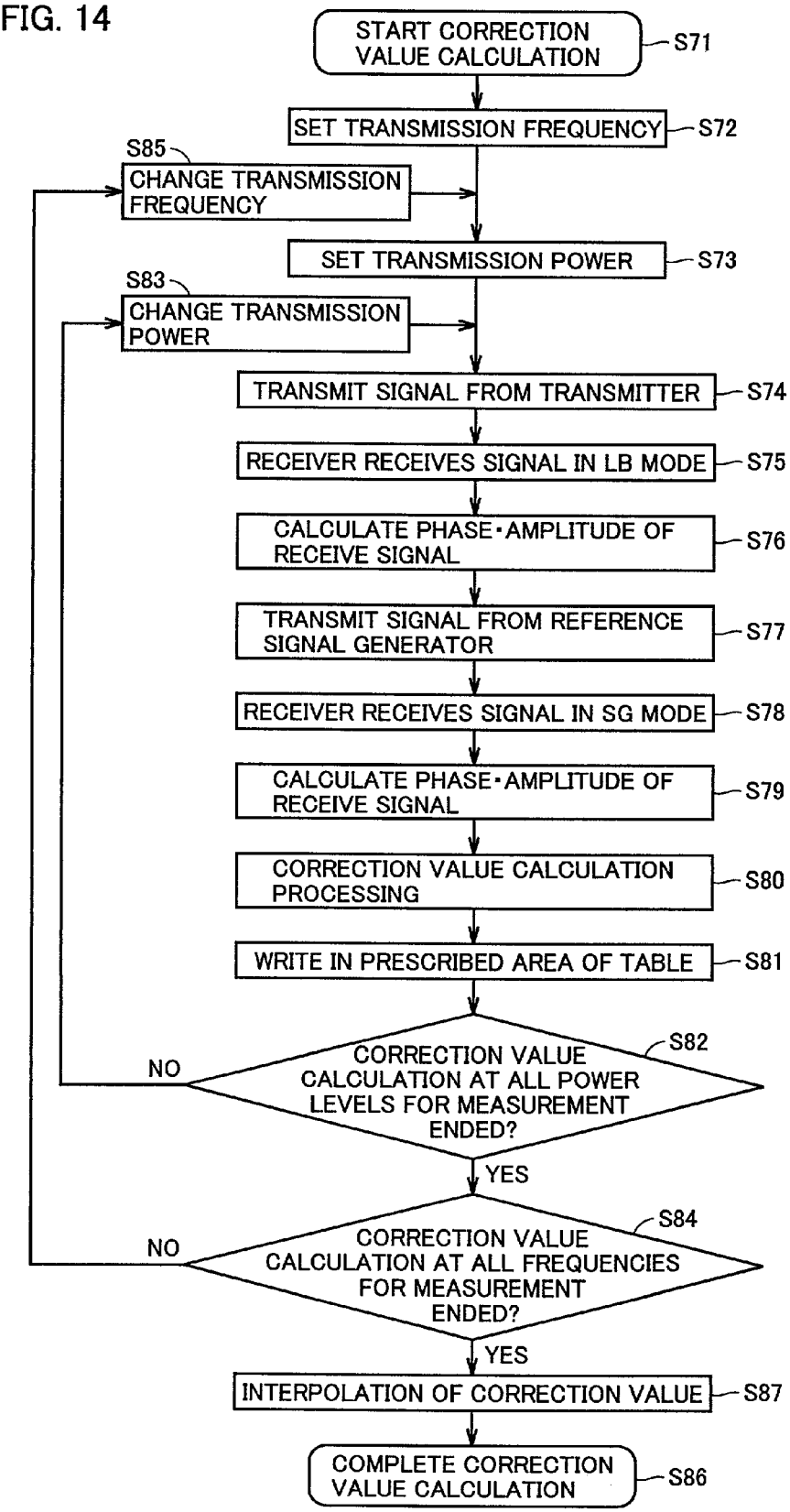
FIG. 14 is a flow chart showing correction value calculation processing according to an embodiment 8 of the present invention.

FIG. 14 is a flow chart showing correction value calculation processing according to an embodiment 8 of the present invention.

In the aforementioned embodiment 7, it has obtained the correction values for the quantity of phase rotation and the quantity of amplitude fluctuation for the respective combinations of a plurality of predetermined transmission frequencies and a plurality of predetermined transmission power levels and stored the same in the prescribed area of the table in the memory 100M.

When the numbers of transmission frequencies and transmission power levels to be measured are large, however, there may be a case where it is not rational to perform measurement and calculation with respect to all combinations of transmission frequencies and transmission power levels. In such a case, it is possible to perform measurement of the quantity of phase rotation and the quantity of amplitude fluctuation and calculation of correction values only with respect to combinations of representative transmission frequencies and transmission power levels among the number of transmission frequencies and transmission power levels to be measured and perform interpolation employing the results thereof thereby obtaining correction values for combinations of all desired transmission frequencies and transmission power levels other than the aforementioned representative frequencies and representative power levels.

In the embodiment 8 of FIG. 14, a step S87 of interpolation processing for correction values is added in addition to the embodiment 7 of FIG. 13. After calculation of correction values for all representative transmission frequencies and transmission power levels and writing in the table are ended at a step S84, correction values for combinations of other transmission frequencies and transmission power level are calculated by an interpolation method shown in FIG. 15.

Figure 15:
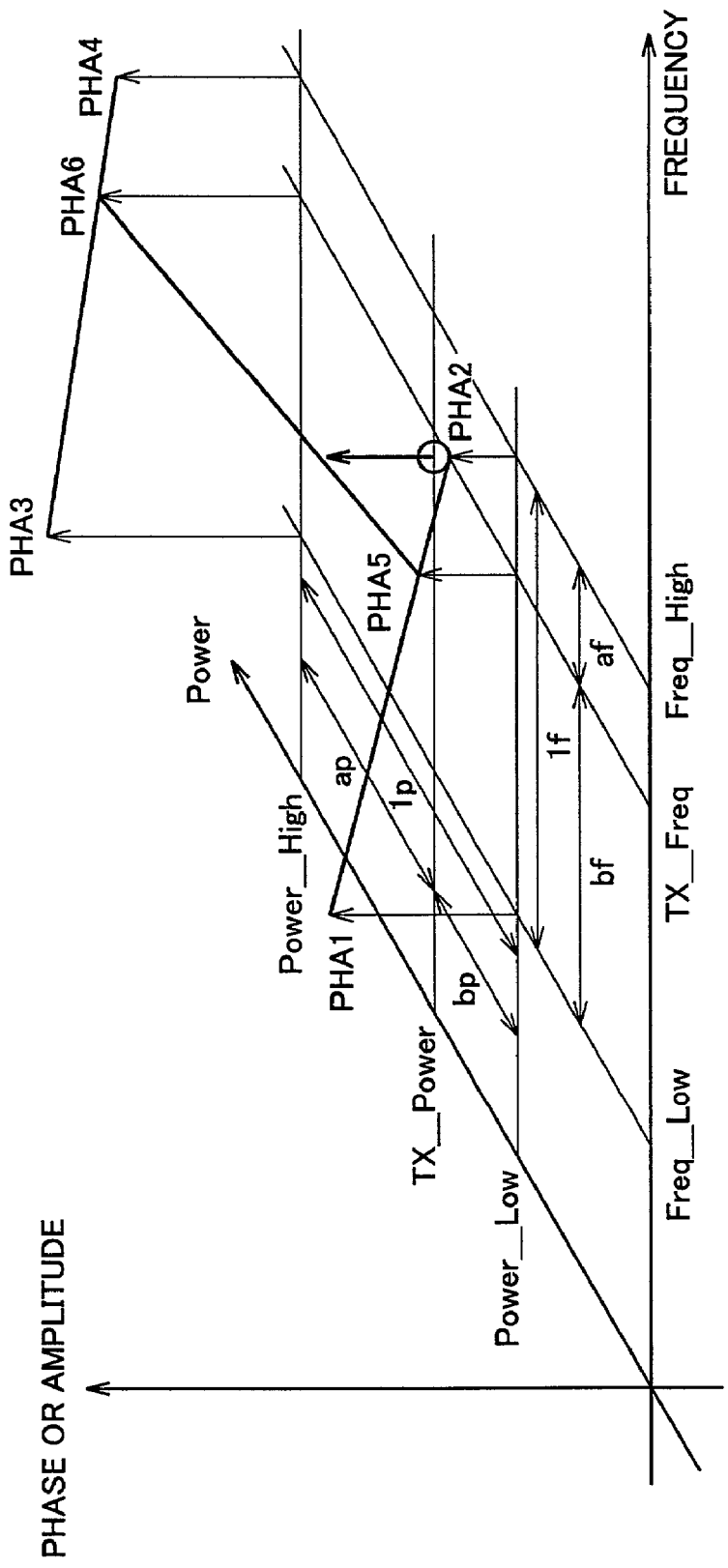
FIG. 15 is a graph diagram showing an interpolation method according to an embodiment 8 of the present invention.
Figure 16:
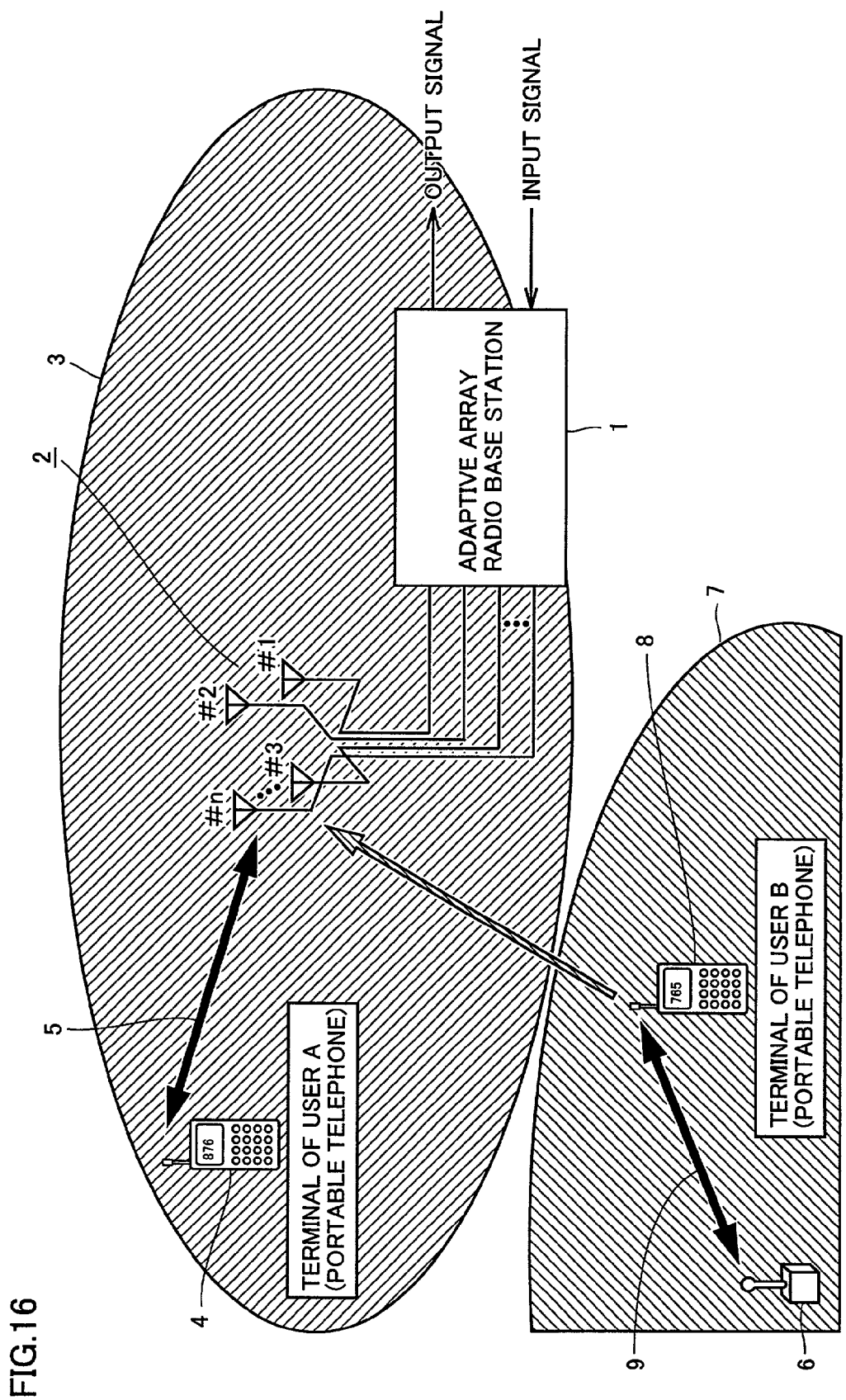
FIG. 16 is a model diagram conceptually showing basic operations of an adaptive array radio base station.

The method of interpolation is now described with reference to a graph of FIG. 15.

First, interpolation in a frequency direction is executed with respect to representative transmission power Power_Low lower than transmission power to be used.

It is assumed that a transmission frequency to be transmitted in practice is TX_Freq, one representative transmission frequency higher than this transmission frequency TX_Freq is Freq_High, and one low representative transmission frequency is Freq_Low.

It is assumed that correction values for the quantity of phase rotation and the quantity of amplitude fluctuation obtained by measurement at the aforementioned Freq_Low are PHA1 and AMP1 respectively, and correction values for the quantity of phase rotation and the quantity of amplitude fluctuation obtained by measurement at the aforementioned Freq_High are PHA2 and AMP2. By interpolation in the frequency direction for Power_Low under such conditions, correction values PHA5 and AMP5 for the used transmission frequency TX_Freq are obtained in the equations shown below.

On the other hand, interpolation in the frequency direction is executed with respect to representative transmission power Power_High higher than transmission power to be used. It is assumed that correction values for the quantity of phase rotation and the quantity of amplitude fluctuation obtained by measurement at the aforementioned Freq_Low are PHA3 and AMP3, and correction values for the quantity of phase rotation and the quantity of amplitude fluctuation obtained by measurement at the aforementioned Freq_High are PHA4 and AMP4. By interpolation in the frequency direction for Power_High under such conditions, correction values PHA6 and AMP6 for the used transmission frequency TX_Freq are obtained in the following equations:

[Num 6]

$$lf = Freq\_High - Freq\_Low$$

$$af = Freq\_High - TX\_Freq$$

$$bf = TX\_Freq - Freq\_Low$$

$$PHA5 = (af*PHA1 + bf*PHA2)/lf$$

$$AMP5 = (af*AMP1 + bf*AMP2)/lf$$

$$PHA6 = (af*PHA3 + bf*PHA4)/lf$$

$$AMP6 = (af*AMP3 + bf*AMP4)/lf$$

Then, interpolation in a power direction is performed on the used transmission frequency TX_Freq.

Under the conditions assuming that the correction values for the quantity of phase rotation and the quantity of amplitude fluctuation obtained by measurement at Power_Low are PHA5 and AMP5 and the correction values for the quantity of phase rotation and the quantity of amplitude fluctuation obtained by measurement at Power_High are PHA6 and AMP6, correction values PHA and AMP for the transmission power TX_Power to be used are obtained in the following equations:

[Num 7]

$$lp = Power\_High - Power\_Low$$

$$ap = Power\_High - TX\_Power$$

$$bp = TX\_Power - Power\_Low$$

$$PHA = (ap*PHA5 + bp*PHA6)/lp$$

$$AMP = (ap*AMP5 + bp*AMP6)/lp$$

While it has previously performed the interpolation in the frequency direction and thereafter performed the interpolation in the power direction in the aforementioned interpolation method, a similar effect can be attained also when previously performing the interpolation in the power direction and thereafter performing the interpolation in the frequency direction to the contrary.

In any of the embodiments heretofore described, the difference in quantity of amplitude fluctuation between the transmission circuit and the receiving circuit is calculated and corrected in each radio system. Dissimilarly to the case of the quantity of phase rotation, however, the fact that there is characteristic difference between the transmission circuit and the receiving circuit itself is not a significant problem but the fact that the difference in quantity of amplitude fluctuation between the transmission and receiving circuits is different in each radio system is the maximum problem in the case of the quantity of amplitude fluctuation. In relation to calibration of amplitude information, therefore, it may be formed to control the quantity of amplitude fluctuation of each radio system so that the difference in quantity of amplitude fluctuation between the transmission and receiving circuits of each radio system becomes a certain common value in addition to the method of correcting the quantity of amplitude fluctuation of each radio system so that the difference in quantity of amplitude fluctuation between the receiving circuit and the transmission circuit of each radio system becomes zero as in the aforementioned respective embodiments.

The embodiments disclosed this time must be considered as illustrative in all points and not restrictive. The scope of the present invention is shown not by the above description but by the scope of claim for patent, and it is intended that all modifications within the meaning and range equivalent to the scope of claim for patent are included.

According to the present invention, as hereinabove described, it has been formed to reflect the difference in quantity of phase rotation and/or quantity of amplitude fluctuation between the transmission circuit and the receiving circuit of the radio apparatus to control of antenna directivity, whereby calibration of transmission characteristics between the receiving circuit and the transmission circuit of the radio apparatus, i.e., calibration of antenna directivity can be performed with a simple and low-priced structure without separately providing a specific measuring circuit.

INDUSTRIAL APPLICABILITY

As hereinabove described, the radio apparatus according to the present invention is suitable to be employed as a radio base station in a mobile communication system such as a portable telephone, and the calibration method for antenna directivity is suitable as a calibration method for directivity of radio waves from a radio base station to a user terminal.

The invention claimed is:

1. A radio apparatus capable of calibration of antenna directivity, comprising:
    an antenna (104);
    a transmission circuit (102) and a receiving circuit (105) sharing said antenna when transmitting/receiving signals;
    a reference signal generator (107) generating a prescribed reference signal;
    switching means (103) selectively connecting an output of said transmission circuit or said reference signal to an input of said receiving circuit in calibration;
    control means (100) supplying a transmit signal to said transmission circuit while receiving a receive signal from said receiving circuit for controlling transmission directivity of said transmit signal transmitted through said transmission circuit and said antenna while controlling receiving directivity of said receive signal received through said antenna and said receiving circuit; and
    arithmetic means (100H) calculating a correction value for correcting difference in quantity of phase rotation and/or quantity of amplitude fluctuation between said transmission circuit and said receiving circuit, wherein
    said arithmetic means includes:
    means controlling said switching means to connect the output of said transmission circuit to the input of said receiving circuit in calibration for calculating first information related to the quantity of phase rotation and/or the quantity of amplitude fluctuation caused in a signal passing through said transmission circuit and said receiving circuit,
    means controlling said switching means to connect said reference signal to the input of said receiving circuit in calibration for calculating second information related to the quantity of phase rotation and/or the quantity of amplitude fluctuation caused in a signal passing through said receiving circuit,
    means subtracting said second information from said first information thereby calculating third information related to the quantity of phase rotation and/or the quantity of amplitude fluctuation caused in a signal passing through said transmission circuit, and
    means calculating said correction value on the basis of said second information and said third information.

2. The radio apparatus according to claim 1, wherein said means calculating second information includes:
    storage means for storing previously detected fourth information related to the quantity of phase rotation and/or the quantity of amplitude fluctuation caused in said reference signal passing through a path from said reference signal generator to said switching means,
    means calculating fifth information related to the quantity of phase rotation and/or the quantity of amplitude fluctuation caused in said reference signal passing through said receiving circuit from said reference signal generator through said switching means, and
    means calculating said second information by subtracting said fourth information from said fifth information.

3. The radio apparatus according to claim 2, wherein said means calculating first information calculates the quantity of phase rotation and/or the quantity of amplitude fluctuation caused in a signal passing through said transmission circuit and said receiving circuit a prescribed number of times for supplying an average value thereof as said first information, and said means calculating fifth information calculates the quantity of phase rotation and/or the quantity of amplitude fluctuation caused in said reference signal passing through said receiving circuit from said reference signal generator through said switching means a prescribed number of times and supplies an average value thereof as said fifth information.

4. The radio apparatus according to claim 1, wherein said control means includes means sequentially changing the transmission frequency of said transmit signal supplied to said transmission circuit, and said arithmetic means calculates said correction value for every transmit signal of a different transmission frequency.

5. The radio apparatus according to claim 4, wherein said arithmetic means further includes interpolation processing means calculating said correction value in a transmit signal of another transmission frequency by interpolation on the basis of said correction value calculated for said every transmit signal of a different transmission frequency.

6. The radio apparatus according to claim 1, wherein said control means includes means sequentially changing the transmission power of said transmit signal supplied to said transmission circuit, and said arithmetic means calculates said correction value for every transmit signal of a different transmission power.

7. The radio apparatus according to claim 6, wherein said arithmetic means further includes interpolation processing means calculating said correction value in a transmit signal of another transmission power by interpolation on the basis of said correction value calculated for said every transmit signal of a different transmission power.

8. The radio apparatus according to claim 1, wherein said control means includes means sequentially changing the transmission frequency and transmission power of said transmit signal supplied to said transmission circuit, and said arithmetic means calculates said correction values for every transmit signal of a different transmission frequency and a different transmission power.

9. The radio apparatus according to claim 8, wherein said arithmetic means further includes interpolation processing means calculating said correction values in a transmit signal of another transmission frequency and another transmission power by interpolation on the basis of said correction values calculated for said every transmit signal of a different transmission frequency and a different transmission power.

10. A radio apparatus capable of calibration of antenna directivity, comprising a plurality of radio systems, wherein each of said radio systems comprises:

an antenna (104);

a transmission circuit (102) and a receiving circuit (105) sharing said antenna when transmitting/receiving signals;

a reference signal generator (107) generating a prescribed reference signal;

switching means (103) selectively connecting an output of said transmission circuit or said reference signal to an input of said receiving circuit in calibration;

control means (100) supplying a transmit signal to said transmission circuit while receiving a receive signal from said receiving circuit for controlling transmission directivity of said transmit signal transmitted through said transmission circuit and said antenna while controlling receiving directivity of said receive signal received through said antenna and said receiving circuit; and arithmetic means (100H) calculating a correction value for correcting difference in quantity of phase rotation and/or quantity of amplitude fluctuation between said transmission circuit and said receiving circuit, and said arithmetic means includes:

means controlling said switching means to connect the output of said transmission circuit to the input of said receiving circuit in calibration for calculating first information related to the quantity of phase rotation and/or the quantity of amplitude fluctuation caused in a signal passing through said transmission circuit and said receiving circuit, means controlling said switching means to connect said reference signal to the input of said receiving circuit in calibration for calculating second information related to the quantity of phase rotation and/or the quantity of amplitude fluctuation caused in a signal passing through said receiving circuit, means subtracting said second information from said first information thereby calculating third information related to the quantity of phase rotation and/or the quantity of amplitude fluctuation caused in a signal passing through said transmission circuit, and means calculating said correction value on the basis of said second information and said third information.

11. A radio apparatus capable of calibration of antenna directivity, comprising:

a reference signal generator (107) generating a prescribed reference signal; and a plurality of radio systems, wherein each of said radio systems comprises:

an antenna (104);

a transmission circuit (102) and a receiving circuit (105) sharing said antenna when transmitting/receiving signals;

switching means (103) selectively connecting an output of said transmission circuit or said reference signal to an input of said receiving circuit in calibration;

control means (100) supplying a transmit signal to said transmission circuit while receiving a receive signal from said receiving circuit for controlling transmission directivity of said transmit signal transmitted through said transmission circuit and said antenna while controlling receiving directivity of said receive signal received through said antenna and said receiving circuit; and arithmetic means (100H) calculating a correction value for correcting difference in quantity of phase rotation and/or quantity of amplitude fluctuation between said transmission circuit and said receiving circuit, and said arithmetic means includes:

means controlling said switching means to connect the output of said transmission circuit to the input of said receiving circuit in calibration for calculating first information related to the quantity of phase rotation and/or the quantity of amplitude fluctuation caused in a signal passing through said transmission circuit and said receiving circuit, means controlling said switching means to connect said reference signal to the input of said receiving circuit in calibration for calculating second information related to the quantity of phase rotation and/or the quantity of amplitude fluctuation caused in a signal passing through said receiving circuit, means subtracting said second information from said first information thereby calculating third information related to the quantity of phase rotation and/or the quantity of amplitude fluctuation caused in a signal passing through said transmission circuit, and means calculating said correction value on the basis of said second information and said third information.

12. The radio apparatus according to claim 11, wherein said means calculating second information includes:

storage means for storing previously detected fourth information related to the quantity of phase rotation and/or the quantity of amplitude fluctuation caused in said reference signal passing through a path from said reference signal generator to said switching means, means calculating fifth information related to the quantity of phase rotation and/or the quantity of amplitude fluctuation caused in said reference signal passing through said receiving circuit from said reference signal generator through said switching means, and means calculating said second information by subtracting said fourth information from said fifth information.

13. The radio apparatus according to claim 12, wherein said means calculating first information calculates the quantity of phase rotation and/or the quantity of amplitude fluctuation caused in a signal passing through said transmission circuit and said receiving circuit a prescribed number of times for supplying an average value thereof as said first information, and said means calculating fifth information calculates the quantity of phase rotation and/or the quantity of amplitude fluctuation caused in said reference signal passing through said receiving circuit from said reference signal generator through said switching means a prescribed number of times and supplies an average value thereof as said fifth information.

14. The radio apparatus according to claim 11, wherein said control means includes means sequentially changing the transmission frequency of said transmit signal supplied to said transmission circuit, and said arithmetic means calculates said correction value for every transmit signal of a different transmission frequency.

15. The radio apparatus according to claim 14, wherein said arithmetic means further includes interpolation processing means calculating said correction value in a transmit signal of another transmission frequency by interpolation on the basis of said correction value calculated for said every transmit signal of a different transmission frequency.

16. The radio apparatus according to claim 11, wherein said control means includes means sequentially changing the transmission power of said transmit signal supplied to said transmission circuit, and said arithmetic means calculates said correction value for every transmit signal of a different transmission power.

17. The radio apparatus according to claim 16, wherein said arithmetic means further includes interpolation processing means calculating said correction value in a transmit signal of another transmission power by interpolation on the basis of said correction value calculated for said every transmit signal of a different transmission power.

18. The radio apparatus according to claim 11, wherein said control means includes means sequentially changing the transmission frequency and transmission power of said transmit signal supplied to said transmission circuit, and said arithmetic means calculates said correction values for every transmit signal of a different transmission frequency and a different transmission power.

19. The radio apparatus according to claim 18, wherein said arithmetic means further includes interpolation processing means calculating said correction values in a transmit signal of another transmission frequency and another transmission power by interpolation on the basis of said correction values calculated for said every transmit signal of a different transmission frequency and a different transmission power.

20. A calibration method for antenna directivity in a radio apparatus, wherein said radio apparatus comprises an antenna (104), a transmission circuit (102) and a receiving circuit (105) sharing said antenna when transmitting/receiving signals, a reference signal generator (107) generating a prescribed reference signal, switching means (103) selectively connecting an output of said transmission circuit or said reference signal to an input of said receiving circuit in calibration, and control means (100) supplying a transmit signal to said transmission circuit while receiving a receive signal from said receiving circuit for controlling transmission directivity of said transmit signal transmitted through said transmission circuit and said antenna while controlling receiving directivity of said receive signal received through said antenna and said receiving circuit, and said calibration method comprises the steps of:

controlling said switching means to connect the output of said transmission circuit to the input of said receiving circuit in calibration for calculating first information related to the quantity of phase rotation and/or the quantity of amplitude fluctuation caused in a signal passing through said transmission circuit and said receiving circuit;

controlling said switching means to connect said reference signal to the input of said receiving circuit in calibration for calculating second information related to the quantity of phase rotation and/or the quantity of amplitude fluctuation caused in a signal passing through said receiving circuit;

subtracting said second information from said first information thereby calculating third information related to the quantity of phase rotation and/or the quantity of amplitude fluctuation caused in a signal passing through said transmission circuit; and calculating a correction value for correcting difference in quantity of phase rotation and/or quantity of amplitude fluctuation between said transmission circuit and said receiving circuit on the basis of said second information and said third information.

21. The method according to claim 20, wherein said step of calculating second information includes the steps of:

previously detecting and storing fourth information related to the quantity of phase rotation and/or the quantity of amplitude fluctuation caused in said reference signal passing through a path from said reference signal generator to said switching means, calculating fifth information related to the quantity of phase rotation and/or the quantity of amplitude fluctuation caused in said reference signal passing through said receiving circuit from said reference signal generator through said switching means, and calculating said second information by subtracting said fourth information from said fifth information.

22. The method according to claim 21, wherein said step of calculating first information calculates the quantity of phase rotation and/or the quantity of amplitude fluctuation caused in the signal passing through said transmission circuit and said receiving circuit a prescribed number of times and supplies an average value thereof as said first information, and said step of calculating fifth information calculates the quantity of phase rotation and/or the quantity of amplitude fluctuation caused in said reference signal passing through said receiving circuit from said reference signal generator through said switching means a prescribed number of times and supplies an average value thereof as said fifth information.

23. The method according to claim 20, further including the steps of:

sequentially changing the transmission frequency of said transmit signal supplied to said transmission circuit, and repeating the step of calculating said correction value for every transmit signal of a different transmission frequency.

24. The method according to claim 23, further including the step of calculating said correction value in a transmit signal of another transmission frequency by interpolation on the basis of said correction value calculated for said every transmit signal of a different transmission frequency.

25. The method according to claim 20, further including the steps of:

sequentially changing the transmission power of said transmit signal supplied to said transmission circuit, and repeating the step of calculating said correction value for every transmit signal of a different transmission power.

26. The method according to claim 25, further including the step of calculating said correction value in a transmit signal of another transmission power by interpolation on the basis of said correction vale calculated for said every transmit signal of a different transmission power.

27. The method according to claim 20, further including the steps of:

sequentially changing the transmission frequency and transmission power of said transmit signal supplied to said transmission circuit, and repeating the step of calculating said correction value for every transmit signal of a different transmission frequency and a different transmission power.

28. The method according to claim 27, further including the step of calculating said correction value in a transmit signal of another transmission frequency and another transmission power by interpolation on the basis of said correction value calculated for said every transmit signal of a different transmission frequency and a different transmission power.

29. A calibration method for antenna directivity in a radio apparatus comprising a reference signal generator (107) generating a prescribed reference signal and a plurality of radio systems, wherein each of said radio systems comprises an antenna (104), a transmission circuit (102) and a receiving circuit (105) sharing said antenna when transmitting/receiving signals, and switching means (103) selectively connecting an output of said transmission circuit or said reference signal to an input of said receiving circuit in calibration, and control means (100) supplying a transmit signal to said transmission circuit while receiving a receive signal from said receiving circuit for controlling transmission directivity of said transmit signal transmitted through said transmission circuit and said antenna while controlling receiving directivity of said receive signal received through said antenna and said receiving circuit, and said calibration method comprises the steps of:

controlling said switching means to connect the output of said transmission circuit to the input of said receiving circuit in calibration for calculating first information related to the quantity of phase rotation and/or the quantity of amplitude fluctuation caused in a signal passing through said transmission circuit and said receiving circuit;

controlling said switching means to connect said reference signal to the input of said receiving circuit in calibration for calculating second information related to the quantity of phase rotation and/or the quantity of amplitude fluctuation caused in a signal passing through said receiving circuit;

subtracting said second information from said first information thereby calculating third information related to the quantity of phase rotation and/or the quantity of amplitude fluctuation caused in a signal passing through said transmission circuit; and calculating a correction value for correcting difference in quantity of phase rotation and/or quantity of amplitude fluctuation between said transmission circuit and said receiving circuit on the basis of said second information and said third information.

30. The method according to claim 29, wherein said step of calculating second information includes the steps of:

previously detecting and storing fourth information related to the quantity of phase rotation and/or the quantity of amplitude fluctuation caused in said reference signal passing through a path from said reference signal generator to said switching means, calculating fifth information related to the quantity of phase rotation and/or the quantity of amplitude fluctuation caused in said reference signal passing through said receiving circuit from said reference signal generator through said switching means, and calculating said second information by subtracting said fourth information from said fifth information.

31. The method according to claim 30, wherein said step of calculating first information calculates the quantity of phase rotation and/or the quantity of amplitude fluctuation caused in the signal passing through said transmission circuit and said receiving circuit a prescribed number of times and supplies an average value thereof as said first information, and said step of calculating fifth information calculates the quantity of phase rotation and/or the quantity of amplitude fluctuation caused in said reference signal passing through said receiving circuit from said reference signal generator through said switching means a prescribed number of times and supplies an average value thereof as said fifth information.

32. The method according to claim 29, further including the steps of:

sequentially changing the transmission frequency of said transmit signal supplied to said transmission circuit, and repeating the step of calculating said correction value for every transmit signal of a different transmission frequency.

33. The method according to claim 32, further including the step of calculating said correction value in a transmit signal of another transmission frequency by interpolation on the basis of said correction value calculated for said every transmit signal of a different transmission frequency.

34. The method according to claim 29, further including the steps of:

sequentially changing the transmission power of said transmit signal supplied to said transmission circuit, and repeating the step of calculating said correction value for every transmit signal of a different transmission power.

35. The method according to claim 34, further including the step of calculating said correction value in a transmit signal of another transmission power by interpolation on the basis of said correction value calculated for said every transmit signal of a different transmission power.

36. The method according to claim 29, further including the steps of:

sequentially changing the transmission frequency and transmission power of said transmit signal supplied to said transmission circuit, and repeating the step of calculating said correction value for every transmit signal of a different transmission frequency and a different transmission power.

37. The method according to claim 36, further including the step of calculating said correction value in a transmit signal of another transmission frequency and another transmission power by interpolation on the basis of said correction value calculated for said every transmit signal of a different transmission frequency and a different transmission power.

* * * * *